(12) United States Patent
Xu et al.

(10) Patent No.: US 9,949,203 B2
(45) Date of Patent: Apr. 17, 2018

(54) WIRELESS ACCESS METHOD AND RELATED DEVICE AND SYSTEM

(71) Applicant: Huawei Device (Dongguan) Co., Ltd., Dongguan (CN)

(72) Inventors: Jianhua Xu, Shenzhen (CN); Rui Sun, Shanghai (CN); Xiaochen Chen, Shanghai (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 0 days.

(21) Appl. No.: 15/106,732

(22) PCT Filed: Dec. 20, 2013

(86) PCT No.: PCT/CN2013/090125
§ 371 (c)(1),
(2) Date: Jun. 20, 2016

(87) PCT Pub. No.: WO2015/089831
PCT Pub. Date: Jun. 25, 2015

(65) Prior Publication Data
US 2017/0251427 A1    Aug. 31, 2017

(51) Int. Cl.
*H04W 48/20*    (2009.01)
*H04W 4/00*     (2018.01)
*H04W 48/14*    (2009.01)
*H04B 17/318*   (2015.01)
*H04W 12/06*    (2009.01)
*H04W 84/12*    (2009.01)

(52) U.S. Cl.
CPC .......... *H04W 48/20* (2013.01); *H04B 17/318* (2015.01); *H04W 4/008* (2013.01); *H04W 12/06* (2013.01); *H04W 48/14* (2013.01); *H04W 84/12* (2013.01)

(58) Field of Classification Search
CPC .... H04W 12/08; H04W 88/08; H04L 43/0811
USPC ....... 455/41.2, 411, 41.1, 404.1, 456.1, 515; 380/259, 270; 370/328, 338; 340/5.54
See application file for complete search history.

(56) References Cited

U.S. PATENT DOCUMENTS

| 2004/0066769 | A1  | 4/2004  | Ahmavaara et al. |
| 2007/0213040 | A1  | 9/2007  | Itou |
| 2010/0080202 | A1* | 7/2010  | Hanson .................. H04W 60/00 370/338 |
| 2010/0323682 | A1  | 12/2010 | Hatayama et al. |

(Continued)

FOREIGN PATENT DOCUMENTS

| CN | 102076060 A | 5/2011 |
| CN | 102883315 A | 1/2013 |

(Continued)

*Primary Examiner* — Kiet M Doan
(74) *Attorney, Agent, or Firm* — Slater Matsil, LLP

(57) ABSTRACT

Embodiments of the present invention provide a wireless access method and a related device and system, where the method includes: reading, by a terminal device, access point information stored in an external near field communication tag; and acquiring, by the terminal device, one piece of target access point information according to the read access point information, and establishing, according to the target access point information, a wireless connection to an access point to which the target access point information belongs.

17 Claims, 13 Drawing Sheets

(56) References Cited

U.S. PATENT DOCUMENTS

| | | | |
|---|---|---|---|
| 2012/0099566 A1 | 4/2012 | Laine et al. | |
| 2012/0192258 A1* | 7/2012 | Spencer et al. | H04W 12/06 726/7 |
| 2013/0029686 A1* | 1/2013 | Moshfeghi | G01S 19/48 455/456.1 |
| 2013/0036231 A1 | 2/2013 | Suumaki | |
| 2013/0176956 A1 | 7/2013 | Yamamoto | |
| 2013/0252547 A1 | 9/2013 | Cho et al. | |
| 2013/0282903 A1* | 10/2013 | DeLuca | H04W 12/04 709/225 |
| 2013/0309971 A1 | 11/2013 | Kiukkonen et al. | |
| 2014/0269411 A1* | 9/2014 | Pelland et al. | H04W 24/02 370/254 |
| 2015/0009016 A1 | 1/2015 | Dai | |
| 2015/0223063 A1 | 8/2015 | Hong et al. | |

FOREIGN PATENT DOCUMENTS

| | | |
|---|---|---|
| CN | 103200567 A | 7/2013 |
| CN | 103281759 A | 9/2013 |
| CN | 103298144 A | 9/2013 |
| CN | 203278811 U | 11/2013 |
| JP | 2005286941 A | 10/2005 |
| JP | 2007243844 A | 9/2007 |
| JP | 2008118538 A | 5/2008 |
| JP | 2009182564 A | 8/2009 |
| JP | 2011182449 A | 9/2011 |
| JP | 2013143616 A | 7/2013 |
| JP | 2013236316 A | 11/2013 |
| WO | 2008047475 A1 | 4/2008 |
| WO | 2013127124 A1 | 9/2013 |

* cited by examiner

WIRELESS ACCESS METHOD AND
RELATED DEVICE AND SYSTEM

CROSS-REFERENCE TO RELATED
APPLICATIONS

This patent application is a national phase filing under section 371 of PCT/CN2013/90125, filed Dec. 20, 2013, which is incorporated herein by reference in its entirety.

TECHNICAL FIELD

The present invention relates to the field of communications technologies, and in particular, to a wireless access method and a related device and system.

BACKGROUND

Currently, an increasing quantity of WIFI access points are deployed in public places such as an airport, a mall, and a station, so that a user in a public place can implement interconnection with the Internet by accessing a WIFI access point. In a practical application, a process in which a user accesses a WIFI access point is generally as follows: The user enables WIFI access point search on a terminal device (for example, a mobile phone); after the terminal device obtains a WIFI access point by means of search, sends a wireless connection request to the WIFI access point; after a prompt of entering a password is received from the WIFI access point, the user enters the password, and the terminal device sends the password to the WIFI access point; and after the WIFI access point verifies that the password is correct, the terminal device is allowed to access the WIFI access point, so that interconnection between the terminal device and the Internet is implemented.

It is found from practice that, in the foregoing process of accessing the WIFI access point, the user not only needs to manually enable WIFI access point search, but also needs to manually enter a password. Consequently, accessing is time-consuming and laborious, and efficiency in accessing the WIFI access point is reduced.

SUMMARY

Embodiments of the present invention disclose a wireless access method and a related device and system, which can effectively improve efficiency in accessing an access point.

A first aspect of the embodiments of the present invention discloses a wireless access method, including: reading, by a terminal device, access point information stored in an external near field communication (NFC) tag; and acquiring, by the terminal device, one piece of target access point information according to the read access point information, and establishing, according to the target access point information, a wireless connection to an access point to which the target access point information belongs.

In a first possible implementation manner of the first aspect of the embodiments of the present invention, the acquiring, by the terminal device, one piece of target access point information according to the read access point information includes: detecting, by the terminal device, a signal strength value of an access point to which each piece of the read access point information belongs; and selecting, by the terminal device, access point information of an access point whose signal strength value is the largest as the target access point information.

In a second possible implementation manner of the first aspect of the embodiments of the present invention, the acquiring, by the terminal device, one piece of target access point information according to the read access point information includes: detecting, by the terminal device, a signal strength value of an access point to which each piece of the read access point information belongs; outputting, by the terminal device, each piece of the read access point information and the signal strength value of the access point to which the access point information belongs; and detecting, by the terminal device, one piece of access point information that is selected by a user according to the signal strength value from the access point information output by the terminal device, and using the piece of access point information as a target access point account.

With reference to the first aspect of the embodiments of the present invention or either of the first and the second possible implementation manners of the first aspect of the embodiments of the present invention, in a third possible implementation manner of the first aspect of the embodiments of the present invention, the access point information includes an access point account.

With reference to the third possible implementation manner of the first aspect of the embodiments of the present invention, in a fourth possible implementation manner of the first aspect of the embodiments of the present invention, the establishing, by the terminal device according to the target access point information, a wireless connection to an access point to which the target access point information belongs includes: sending, by the terminal device according to a target access point account, a wireless connection request to an access point to which the target access point account belongs; and receiving, by the terminal device, a wireless connection success response sent by the access point to which the target access point account belongs.

With reference to the first aspect of the embodiments of the present invention or either of the first and the second possible implementation manners of the first aspect of the embodiments of the present invention, in a fifth possible implementation manner of the first aspect of the embodiments of the present invention, the access point information includes an access point account and an access password bound to the access point account.

With reference to the fifth possible implementation manner of the first aspect of the embodiments of the present invention, in a sixth possible implementation manner of the first aspect of the embodiments of the present invention, the establishing, by the terminal device according to the target access point information, a wireless connection to an access point to which the target access point information belongs includes: sending, by the terminal device according to a target access point account, a wireless connection request to an access point to which the target access point account belongs, where the wireless connection request includes an access password bound to the target access point account; and receiving a wireless connection success response that is sent after the access point to which the target access point account belongs verifies that the access password bound to the target access point account is correct.

With reference to the fifth possible implementation manner of the first aspect of the embodiments of the present invention, in a seventh possible implementation manner of the first aspect of the embodiments of the present invention, the establishing, by the terminal device according to the target access point information, a wireless connection to an access point to which the target access point information belongs includes: sending, by the terminal device according to a target access point account, a wireless connection request to an access point to which the target access point account belongs; receiving, by the terminal device, prompt information sent by the access point to which the target access point account belongs, where the prompt information is used to prompt sending of an access password bound to the target access point account; sending, by the terminal device, the access password bound to the target access point account to the access point to which the target access point account belongs; and receiving, by the terminal device, a wireless connection success response that is sent after the access point to which the target access point account belongs verifies that the access password bound to the target access point account is correct.

With reference to the first aspect of the embodiments of the present invention or either of the first and the second possible implementation manners of the first aspect of the embodiments of the present invention, in an eighth possible implementation manner of the first aspect of the embodiments of the present invention, after the reading, by a terminal device, access point information stored in an external near field communication tag, the method further includes: storing, by the terminal device, the access point information.

With reference to the eighth possible implementation manner of the first aspect of the embodiments of the present invention, in a ninth possible implementation manner of the first aspect of the embodiments of the present invention, after the storing, by the terminal device, the access point information, the method further includes: determining, by the terminal device, whether a storage time of the access point information exceeds a preset threshold; and if the storage time exceeds the preset threshold, deleting the stored access point information.

With reference to the eighth possible implementation manner of the first aspect of the embodiments of the present invention, in a tenth possible implementation manner of the first aspect of the embodiments of the present invention, after the storing, by the terminal device, the access point information, the method further includes: detecting, by the terminal device, whether a wireless disconnection instruction entered by the user is received; and if the wireless disconnection instruction entered by the user is received, deleting the stored access point information.

With reference to the first aspect of the embodiments of the present invention or either of the first and the second possible implementation manners of the first aspect of the embodiments of the present invention, in an eleventh possible implementation manner of the first aspect of the embodiments of the present invention, the access point information includes one or more pieces of WIFI access point information and Bluetooth access point information.

A second aspect of the embodiments of the present invention discloses a computer storage medium. The computer storage medium stores a program, and when the program is executed, all steps of the wireless access method disclosed in the first aspect of the embodiments of the present invention are executed.

A third aspect of the embodiments of the present invention discloses a terminal device. The terminal device includes a reading module, configured to read access point information stored in an external NFC tag. The terminal device also includes a main control module, configured to: acquire one piece of target access point information according to the access point information read by the reading module, and output the one piece of target access point information to a radio frequency module. The terminal device also includes the radio frequency module, configured to establish, according to the target access point information output by the main control module, a wireless connection to an access point to which the target access point information belongs.

In a first possible implementation manner of the third aspect of the embodiments of the present invention, the main control module includes: a detection unit, configured to: detect a signal strength value of an access point to which each piece of the access point information read by the reading module belongs, and output the signal strength value to a selection unit; and the selection unit, configured to: select, from the access point information read by the reading module and according to the signal strength value that is of the access point to which each piece of the access point information belongs and that is output by the detection unit, access point information of an access point whose signal strength value is the largest as the target access point information, and output the target access point information to the radio frequency module.

In a second possible implementation manner of the third aspect of the embodiments of the present invention, the main control module includes: a first detection unit, configured to: detect a signal strength value of an access point to which each piece of the access point information read by the reading module belongs, and output the signal strength value to an input/output unit; the input/output unit, configured to output each piece of the access point information read by the reading module and the signal strength value that is of the access point to which the access point information belongs and that is detected by the first detection unit; and a second detection unit, configured to: detect one piece of target access point information that is selected by a user according to the signal strength value from the access point information output by the input/output unit, and output the one piece of target access point information to the radio frequency module.

With reference to the third aspect of the embodiments of the present invention or either of the first and the second possible implementation manners of the third aspect of the embodiments of the present invention, in a third possible implementation manner of the third aspect of the embodiments of the present invention, the access point information includes an access point account.

With reference to the third possible implementation manner of the third aspect of the embodiments of the present invention, in a fourth possible implementation manner of the third aspect of the embodiments of the present invention, the radio frequency module is configured to: send, according to a target access point account output by the main control module, a wireless connection request to an access point to which the target access point account belongs; and receive a wireless connection success response sent by the access point to which the target access point account belongs.

With reference to the third aspect of the embodiments of the present invention or either of the first and the second possible implementation manners of the third aspect of the embodiments of the present invention, in a fifth possible implementation manner of the third aspect of the embodiments of the present invention, the access point information includes an access point account and an access password bound to the access point account.

With reference to the fifth possible implementation manner of the third aspect of the embodiments of the present invention, in a sixth possible implementation manner of the third aspect of the embodiments of the present invention, the radio frequency module includes: a reading unit, configured to: read, from the reading module according to a target access point account output by the main control module, an access password bound to the target access point account, and output the access password to a communication unit; and the communication unit, configured to: send, according to a target access point account output by the main control module, a wireless connection request to an access point to which the target access point account belongs, where the wireless connection request includes the access password that is bound to the target access point account and that is output by the reading unit; and receive a wireless connection success response that is sent after the access point to which the target access point account belongs verifies that the access password bound to the target access point account is correct.

With reference to the fifth possible implementation manner of the third aspect of the embodiments of the present invention, in a seventh possible implementation manner of the third aspect of the embodiments of the present invention, the radio frequency module includes: a communication unit, configured to: send, according to a target access point account output by the main control module, a wireless connection request to an access point to which the target access point account belongs; receive prompt information sent by the access point to which the target access point account belongs; and enable a reading unit, where the prompt information is used to prompt sending of an access password bound to the target access point account; and the reading unit, configured to: read, from the reading module according to a target access point account output by the main control module, the access password bound to the target access point account, and output the access password to the communication unit; where the communication unit is further configured to: send the access password bound to the target access point account to the access point to which the target access point account belongs; and receive a wireless connection success response that is sent after the access point to which the target access point account belongs verifies that the access password bound to the target access point account is correct.

With reference to the third aspect of the embodiments of the present invention or either of the first and the second possible implementation manners of the third aspect of the embodiments of the present invention, in an eighth possible implementation manner of the third aspect of the embodiments of the present invention, the terminal device further includes: a storage module, configured to store the access point information read by the reading module.

With reference to the eighth possible implementation manner of the third aspect of the embodiments of the present invention, in a ninth possible implementation manner of the third aspect of the embodiments of the present invention, the terminal device further includes: a processing module, configured to: determine whether a storage time for storing the access point information by the storage module exceeds a preset threshold; and if the storage time exceeds the preset threshold, enable a first control module; and the first control module, configured to delete the access point information stored by the storage module.

With reference to the eighth possible implementation manner of the third aspect of the embodiments of the present invention, in a tenth possible implementation manner of the third aspect of the embodiments of the present invention, the terminal device further includes: a third detection module, configured to: detect whether a wireless disconnection instruction entered by the user is received; and if the wireless disconnection instruction entered by the user is received, enable a second control module; and the second control module, configured to delete the access point information stored by the storage module.

With reference to the third aspect of the embodiments of the present invention or either of the first and the second possible implementation manners of the third aspect of the embodiments of the present invention, in an eleventh possible implementation manner of the third aspect of the embodiments of the present invention, the access point information includes one or more pieces of WIFI access point information and Bluetooth access point information.

A fourth aspect of the embodiments of the present invention discloses a terminal device, including a processor, a near field communication NFC module and an input/output module that are connected to the processor by using an interface, a memory that is connected to the processor by using a bus, a coupler that is connected to the processor by using multiple network interfaces, and an antenna module that is connected to the coupler, where the memory stores a group of program code. The processor is configured to invoke the program code stored in the memory, so as to execute the following operations: controlling the NFC module to read access point information stored in an external NFC tag; and acquiring one piece of target access point information according to the read access point information, and establishing, according to the target access point information, a wireless connection between the antenna module and an access point to which the target access point information belongs.

In a first possible implementation manner of the fourth aspect of the embodiments of the present invention, that the processor acquires the one piece of target access point information according to the read access point information includes: controlling the antenna module to detect a signal of an access point to which each piece of the read access point information belongs; calculating a signal strength value that is of the access point to which each piece of the access point information belongs and that is detected by the antenna module; and selecting access point information of an access point whose signal strength value is the largest as the target access point information.

In a second possible implementation manner of the fourth aspect of the embodiments of the present invention, that the processor acquires the one piece of target access point information according to the read access point information includes: controlling the antenna module to detect a signal of an access point to which each piece of the read access point information belongs; calculating a signal strength value that is of the access point to which each piece of the access point information belongs and that is detected by the antenna module; controlling the input/output module to output each piece of the access point information and the signal strength value that is of the access point to which the access point information belongs and that is obtained by means of calculation; and controlling the input/output module to detect any piece of access point information that is selected by a user according to the signal strength value from the access point information output by the input/output module, and use the piece of access point information as the target access point information.

With reference to the fourth aspect of the embodiments of the present invention or either of the first and the second possible implementation manners of the fourth aspect of the embodiments of the present invention, in a third possible implementation manner of the fourth aspect of the embodiments of the present invention, the access point information includes an access point account.

With reference to the third possible implementation manner of the fourth aspect of the embodiments of the present invention, in a fourth possible implementation manner of the fourth aspect of the embodiments of the present invention, that the processor establishes, according to the target access point information, the wireless connection between the antenna module and the access point to which the target access point information belongs includes: controlling the antenna module to send, according to a target access point account, a wireless connection request to an access point to which the target access point account belongs, so that the antenna module receives a wireless connection success response sent by the access point to which the target access point account belongs.

With reference to the fourth aspect of the embodiments of the present invention or either of the first and the second possible implementation manners of the fourth aspect of the embodiments of the present invention, in a fifth possible implementation manner of the fourth aspect of the embodiments of the present invention, the access point information includes an access point account and an access password bound to the access point account.

With reference to the fifth possible implementation manner of the fourth aspect of the embodiments of the present invention, in a sixth possible implementation manner of the fourth aspect of the embodiments of the present invention, that the processor establishes, according to the target access point information, the wireless connection between the antenna module and the access point to which the target access point information belongs includes: controlling the antenna module to send, according to a target access point account, a wireless connection request to an access point to which the target access point account belongs, where the wireless connection request includes an access password bound to the target access point account, so that the antenna module receives a wireless connection success response that is sent after the access point to which the target access point account belongs verifies that the access password bound to the target access point account is correct.

With reference to the fifth possible implementation manner of the fourth aspect of the embodiments of the present invention, in a seventh possible implementation manner of the fourth aspect of the embodiments of the present invention, that the processor establishes, according to the target access point information, the wireless connection between the antenna module and the access point to which the target access point information belongs includes: controlling the antenna module to send, according to a target access point account, a wireless connection request to an access point to which the target access point account belongs, so that the antenna module receives prompt information sent by the access point to which the target access point account belongs, where the prompt information is used to prompt sending of an access password bound to the target access point account, and so that the antenna module sends the access password bound to the target access point account to the access point to which the target access point account belongs, and receives a wireless connection success response that is sent after the access point to which the target access point account belongs verifies that the access password bound to the target access point account is correct.

With reference to the fourth aspect of the embodiments of the present invention or either of the first and the second possible implementation manners of the fourth aspect of the embodiments of the present invention, in an eighth possible implementation manner of the fourth aspect of the embodiments of the present invention, the processor further executes the following operation: controlling the memory to store the read access point information.

With reference to the eighth possible implementation manner of the fourth aspect of the embodiments of the present invention, in a ninth possible implementation manner of the fourth aspect of the embodiments of the present invention, the processor further executes the following operations: determining whether a storage time of the access point information exceeds a preset threshold; and if the storage time exceeds the preset threshold, controlling the memory to delete the stored access point information.

With reference to the eighth possible implementation manner of the fourth aspect of the embodiments of the present invention, in a tenth possible implementation manner of the fourth aspect of the embodiments of the present invention, the processor further executes the following operations: detecting whether the input/output module receives a wireless disconnection instruction entered by the user; and if the input/output module receives the wireless disconnection instruction entered by the user, controlling the memory to delete the stored access point information.

With reference to the fourth aspect of the embodiments of the present invention or either of the first and the second possible implementation manners of the fourth aspect of the embodiments of the present invention, in an eleventh possible implementation manner of the fourth aspect of the embodiments of the present invention, the access point information includes one or more pieces of WIFI access point information and Bluetooth access point information.

A fifth aspect of the embodiments of the present invention discloses a wireless access system. The wireless access system includes a terminal device, and a near field communication tag and an access point to which target access point information belongs that are independent of the terminal device. The near field communication tag is configured to store access point information. The terminal device is configured to: read the access point information stored in the near field communication tag, acquire one piece of the target access point information according to the read access point information, and establish, according to the target access point information, a wireless connection to the access point to which the target access point information belongs.

In a first possible implementation manner of the fifth aspect of the embodiments of the present invention, a manner in which the terminal device acquires one piece of the target access point information according to the read access point information is specifically as follows: the terminal device is configured to: detect a signal strength value of an access point to which each piece of the read access point information belongs, and select access point information of an access point whose signal strength value is the largest as a target access point account.

In a second possible implementation manner of the fifth aspect of the embodiments of the present invention, a manner in which the terminal device acquires one piece of the target access point information according to the read access point information is specifically as follows: the terminal device is configured to: detect a signal strength value of an access point to which each piece of the read access point information belongs, and output each piece of the read access point information and the detected signal strength value of the access point to which the access point information belongs; and detect one piece of access point information that is selected by a user according to the signal strength value from the access point information output by the terminal device, and use the piece of access point information as the target access point information.

With reference to the fifth aspect of the embodiments of the present invention or either of the first and the second possible implementation manners of the fifth aspect of the embodiments of the present invention, in a third possible implementation manner of the fifth aspect of the embodiments of the present invention, the access point information includes an access point account.

With reference to the third possible implementation manner of the fifth aspect of the embodiments of the present invention, in a fourth possible implementation manner of the fifth aspect of the embodiments of the present invention, a manner in which the terminal device establishes, according to the target access point information, the wireless connection to the access point to which the target access point information belongs is specifically as follows: the terminal device is configured to: send, according to a target access point account, a wireless connection request to an access point to which the target access point account belongs; and receive a wireless connection success response sent by the access point to which the target access point account belongs.

With reference to the fifth aspect of the embodiments of the present invention or either of the first and the second possible implementation manners of the fifth aspect of the embodiments of the present invention, in a fifth possible implementation manner of the fifth aspect of the embodiments of the present invention, the access point information includes an access point account and an access password bound to the access point account.

With reference to the fifth possible implementation manner of the fifth aspect of the embodiments of the present invention, in a sixth possible implementation manner of the fifth aspect of the embodiments of the present invention, a manner in which the terminal device establishes, according to the target access point information, the wireless connection to the access point to which the target access point information belongs is specifically as follows: the terminal device is configured to: send, according to a target access point account, a wireless connection request to an access point to which the target access point account belongs, where the wireless connection request includes an access password bound to the target access point account; and receive a wireless connection success response that is sent after the access point to which the target access point account belongs verifies that the access password bound to the target access point account is correct.

With reference to the fifth possible implementation manner of the fifth aspect of the embodiments of the present invention, in a seventh possible implementation manner of the fifth aspect of the embodiments of the present invention, a manner in which the terminal device establishes, according to the target access point information, the wireless connection to the access point to which the target access point information belongs is specifically as follows: the terminal device is configured to: send, according to a target access point account, a wireless connection request to an access point to which the target access point account belongs; receive prompt information sent by the access point to which the target access point account belongs, where the prompt information is used to prompt sending of an access password bound to the target access point account; send the access password bound to the target access point account to the access point to which the target access point account belongs; and receive a wireless connection success response that is sent after the access point to which the target access point account belongs verifies that the access password bound to the target access point account is correct.

With reference to the fifth aspect of the embodiments of the present invention or either of the first and the second possible implementation manners of the fifth aspect of the embodiments of the present invention, in an eighth possible implementation manner of the fifth aspect of the embodiments of the present invention, the terminal device is further configured to store the access point information after reading the access point information stored in the external near field communication tag.

With reference to the eighth possible implementation manner of the fifth aspect of the embodiments of the present invention, in a ninth possible implementation manner of the fifth aspect of the embodiments of the present invention, the terminal device is further configured to: after storing the access point information, determine whether a storage time of the access point information exceeds a preset threshold; and if the storage time exceeds the preset threshold, delete the stored access point information.

With reference to the eighth possible implementation manner of the fifth aspect of the embodiments of the present invention, in a tenth possible implementation manner of the fifth aspect of the embodiments of the present invention, the terminal device is further configured to: after storing the access point information, detect whether a wireless disconnection instruction entered by the user is received; and if the wireless disconnection instruction entered by the user is received, delete the stored access point information.

With reference to the fifth aspect of the embodiments of the present invention or either of the first and the second possible implementation manners of the fifth aspect of the embodiments of the present invention, in an eleventh possible implementation manner of the fifth aspect of the embodiments of the present invention, the access point information includes one or more pieces of WIFI access point information and Bluetooth access point information.

Compared with the prior art, the embodiments of the present invention have the following beneficial effects.

In the embodiments of the present invention, a terminal device may read access point information stored in an NFC tag, and may acquire one piece of target access point information according to the read access point information; further, the terminal device may establish, according to the target access point information, a wireless connection to an access point to which the target access point information belongs, thereby implementing automatically access to the access point to which the target access point information belongs. Implementing the embodiments of the present invention can avoid operations such as manually enabling access point search and manually entering a password by a user, so that efficiency in accessing an access point can be effectively improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The embodiments of the present invention disclose a wireless access method and a related device and system, which can effectively improve efficiency in accessing an access point. Detailed descriptions are separately provided in the following.

Figure 1:
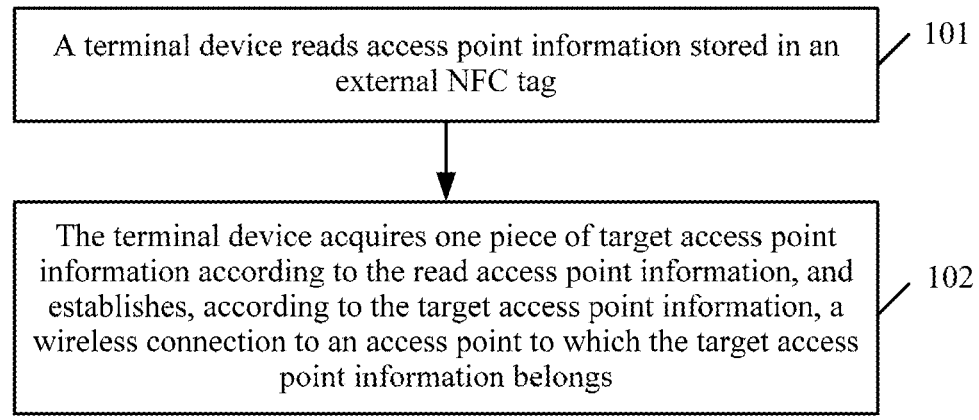
FIG. 1 is a schematic flowchart of a wireless access method according to an embodiment of the present invention.

Referring to FIG. 1, FIG. 1 is a schematic flowchart of a wireless access method according to an embodiment of the present invention. The wireless access method shown in FIG. 1 may include the following steps.

101. A terminal device reads access point information stored in an external NFC tag.

102. The terminal device acquires one piece of target access point information according to the read access point information, and establishes, according to the target access point information, a wireless connection to an access point to which the target access point information belongs.

In this embodiment of the present invention, the terminal device may include a terminal device such as a smartphone, a tablet computer, a personal digital assistant (PDA), or a mobile Internet device (MID) having an NFC module, which is not repeated subsequently in this embodiment of the present invention. The terminal device may include at least one processor, and the terminal device may work under the control of the at least one processor.

In this embodiment of the present invention, a user may hold the terminal device to approach the external NFC tag, so that the terminal device may read, by using the NFC module of the terminal device, the access point information stored in the external NFC tag.

In an optional implementation manner, the NFC tag may store only one piece of access point information, or the NFC tag may store multiple pieces of access point information, which is not limited in this embodiment of the present invention.

In an optional implementation manner, the access point information may include one or more pieces of WIFI access point information and Bluetooth access point information. The WIFI access point information may include a WIFI access point account and an access password bound to the WIFI access point account, and the Bluetooth access point information may include a Bluetooth access point account and an access password bound to the Bluetooth access point account.

In an optional implementation manner, in the foregoing step 102, that the terminal device acquires the one piece of target access point information according to the read access point information may include the following steps:

Step (11): The terminal device detects a signal strength value of an access point to which each piece of the read access point information belongs.

Step (12): The terminal device selects access point information of an access point whose signal strength value is the largest as the target access point information.

By performing step (11) and step (12), the terminal device can automatically select, in the background, the access point information of the access point whose signal strength value is the largest as the target access point information.

In another optional implementation manner, in the foregoing step 102, that the terminal device acquires the one piece of target access point information according to the read access point information may include the following steps:

Step (21): The terminal device detects a signal strength value of an access point to which each piece of the read access point information belongs.

Step (22): The terminal device outputs each piece of the read access point information and the signal strength value of the access point to which the access point information belongs.

Step (23): The terminal device detects one piece of access point information that is selected by a user according to the signal strength value from the access point information output by the terminal device, and uses the piece of access point information as a target access point account.

By performing steps (21) to (23), the user can select desirable access point information as the target access point information.

In this embodiment of the present invention, the access point information may include an access point account, or the access point information may include an access point account and an access password bound to the access point account, which is not limited in this embodiment of the present invention.

For example, when the access point information includes an access point account, in the foregoing step 102, that the terminal device establishes, according to the target access point information, the wireless connection to the access point to which the target access point information belongs may include the following steps:

Step (31): The terminal device sends, according to a target access point account, a wireless connection request to an access point to which the target access point account belongs, where the wireless connection request includes an access password bound to the target access point account.

Step (32): The terminal device receives a wireless connection success response that is sent after the access point to which the target access point account belongs verifies that the access password bound to the target access point account is correct.

By performing step (31) and step (32), if the access password is not required, the terminal device can automatically access the access point to which the target access point information belongs, to establish the wireless connection between the terminal device and the access point to which the target access point information belongs.

For another example, when the access point information includes an access point account and an access password bound to the access point account, in the foregoing step 102, that the terminal device establishes, according to the target access point information, the wireless connection to the access point to which the target access point information belongs may include the following steps:

Step (41): The terminal device sends, according to a target access point account, a wireless connection request to an access point to which the target access point account belongs, where the wireless connection request includes an access password bound to the target access point account.

Step (42): The terminal device receives a wireless connection success response that is sent after the access point to which the target access point account belongs verifies that the access password bound to the target access point account is correct.

By performing step (41) and step (42), if the access password is required, the terminal device can quickly and automatically access the access point to which the target access point information belongs, to establish the wireless connection between the terminal device and the access point to which the target access point information belongs.

For another example, when the access point information includes an access point account and an access password bound to the access point account, in the foregoing step 102, that the terminal device establishes, according to the target access point information, the wireless connection to the access point to which the target access point information belongs may include the following steps:

Step (51): The terminal device sends, according to a target access point account, a wireless connection request to an access point to which the target access point account belongs.

Step (52): The terminal device receives prompt information sent by the access point to which the target access point account belongs, where the prompt information is used to prompt sending of an access password bound to the target access point account.

Step (53): The terminal device sends the access password bound to the target access point account to the access point to which the target access point account belongs.

Step (54): The terminal device receives a wireless connection success response that is sent after the access point to which the target access point account belongs verifies that the access password bound to the target access point account is correct.

By performing step (51) and step (52), if the access password is required, the terminal device can automatically access, by using an existing wireless access manner, the access point to which the target access point information belongs, to establish the wireless connection between the terminal device and the access point to which the target access point information belongs.

In an optional implementation manner, in the wireless access method described in FIG. 1, after executing step 101, the terminal device may further store the read access point information.

In another optional implementation manner, in the wireless access method described in FIG. 1, after the terminal device stores the read access point information, the terminal device may further determine whether a storage time of the access point information exceeds a preset threshold; and if the storage time exceeds the preset threshold, delete the stored access point information. Alternatively, after the terminal device stores the read access point information, the terminal device may detect whether a wireless disconnection instruction entered by the user is received; and if the wireless disconnection instruction entered by the user is received, delete the stored access point information. Therefore, storage space of the terminal device that is occupied by the access point information can be released.

In this embodiment of the present invention, in the wireless access method described in FIG. 1, operations such as manually enabling access point search and manually entering a password by a user can be avoided, so that efficiency in accessing an access point can be effectively improved.

Figure 2:
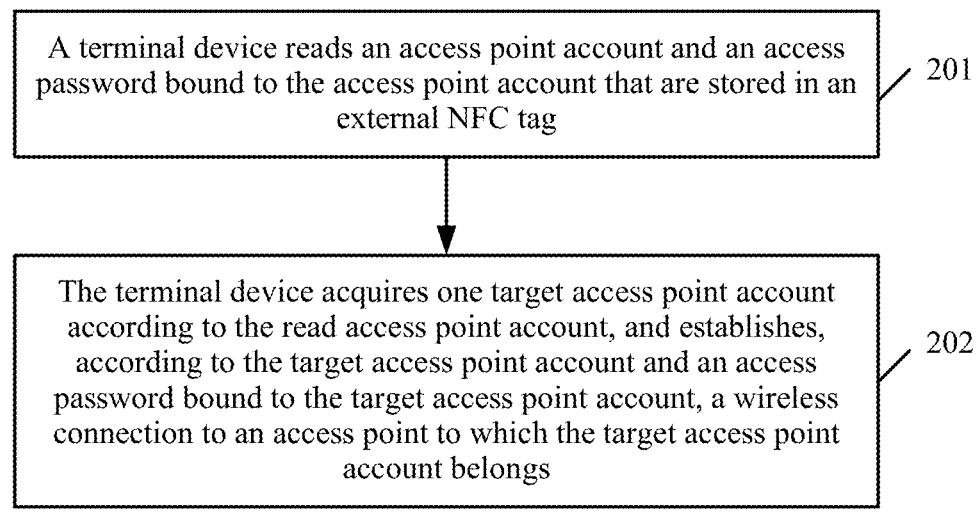
FIG. 2 is a schematic flowchart of another wireless access method according to an embodiment of the present invention.

Referring to FIG. 2, FIG. 2 is a schematic flowchart of a wireless access method according to an embodiment of the present invention. In the wireless access method described in FIG. 2, an example in which access point information includes an access point account and an access password bound to the access point account is used for description. The wireless access method shown in FIG. 2 may include the following steps:

201. A terminal device reads an access point account and an access password bound to the access point account that are stored in an external NFC tag.

In this embodiment of the present invention, a user may hold the terminal device to approach the external NFC tag, so that the terminal device may read, by using an NFC module of the terminal device, the access point account and the access password bound to the access point account that are stored in the external NFC tag.

In this embodiment of the present invention, the NFC tag may store only one access point account and an access password bound to the access point account, or the NFC tag may store multiple access point accounts and access passwords bound to the multiple access point accounts, which is not limited in this embodiment of the present invention.

In this embodiment of the present invention, the access point account may include an access point name (for example, TP-LINK1), an access point identifier, and the like.

In this embodiment of the present invention, the access point account may be a WIFI access point account or may be a Bluetooth access point account. Specially, when the NFC tag stores multiple access point accounts and access passwords bound to the multiple access point accounts, the multiple access point accounts stored in the NFC tag may include only WIFI access point accounts, or may include only Bluetooth access point accounts, or may include some WIFI access point accounts and some Bluetooth access point accounts.

202. The terminal device acquires one target access point account according to the read access point account, and establishes, according to the target access point account and an access password bound to the target access point account, a wireless connection to an access point to which the target access point account belongs.

In this embodiment of the present invention, when the NFC tag includes only one access point account and an access password bound to the access point account, the terminal device may use the read access point account as the target access point account.

In this embodiment of the present invention, when the NFC tag includes multiple access point accounts and access passwords bound to the multiple access point accounts, the terminal device may select any access point account from the read access point accounts as the target access point account. Alternatively, the terminal device may detect a signal strength value of an access point to which each of the read access point accounts belongs, and select an access point account of an access point whose signal strength value is the largest as the target access point account. Alternatively, the terminal device may detect a signal strength value of an access point to which each of the read access point accounts belongs and output each of the read access point accounts and the detected signal strength value of the access point to which the access point account belongs, and may detect any access point account that is selected by the user according to the signal strength value from the access point accounts output by the terminal device and use the access point account as the target access point account.

In this embodiment of the present invention, in step 202, that the terminal device establishes, according to the target access point account and the access password bound to the target access point account, the wireless connection to the access point to which the target access point account belongs may be implemented by performing the following steps:

Step (A1): The terminal device sends, according to the target access point account, a wireless connection request to the access point to which the target access point account belongs, where the wireless connection request includes the access password bound to the target access point account.

Step (B1): The terminal device receives a wireless connection success response that is sent after the access point to which the target access point account belongs verifies that the access password bound to the target access point account is correct.

In this embodiment of the present invention, when the target access point account is a WIFI access point account, the terminal device may enable a WIFI module (if the WIFI module has been enabled, the WIFI module does not need to be enabled again) to send the wireless connection request to the access point to which the target access point account belongs, where the wireless connection request includes the access password bound to the target access point account.

In this embodiment of the present invention, when the target access point account is a Bluetooth access point account, the terminal device may enable a Bluetooth module (if the Bluetooth module has been enabled, the Bluetooth module does not need to be enabled again) to send the wireless connection request to the access point to which the target access point account belongs, where the wireless connection request includes the access password bound to the target access point account.

In this embodiment of the present invention, the access point to which the target access point account belongs may verify whether the access password bound to the target access point account is the same as a locally set access password; and if the access password bound to the target access point account is the same as the locally set access password, verify that the access password bound to the target access point account is correct, and in this case, the access point to which the target access point account belongs may send a wireless connection success response to the terminal device; or if the access password bound to the target access point account is different from the locally set access password, verify that the access password bound to the target access point account is wrong, and in this case, the access point to which the target access point account belongs may send a wireless connection failure response to the terminal device.

In this embodiment of the present invention, when the target access point account is a WIFI access point account, the terminal device may receive, by using the WIFI module, the wireless connection success response that is sent after the access point to which the target access point account belongs verifies that the access password bound to the target access point account is correct.

In this embodiment of the present invention, when the target access point account is a Bluetooth access point account, the terminal device may receive, by using the Bluetooth module, the wireless connection success response that is sent after the access point to which the target access point account belongs verifies that the access password bound to the target access point account is correct.

In this embodiment of the present invention, in step 202, that the terminal device establishes, according to the target access point account and the access password bound to the target access point account, the wireless connection to the access point to which the target access point account belongs may also be implemented by performing the following steps:

Step (A2): The terminal device sends, according to the target access point account, a wireless connection request to the access point to which the target access point account belongs.

Step (B2): The terminal device receives prompt information sent by the access point to which the target access point account belongs, where the prompt information is used to prompt sending of the access password bound to the target access point account.

Step (C2): The terminal device sends the access password bound to the target access point account to the access point to which the target access point account belongs.

Step (D4): The terminal device receives a wireless connection success response that is sent after the access point to which the target access point account belongs verifies that the access password bound to the target access point account is correct.

Based on the foregoing step 201, after the terminal device acquires one target access point account according to the read access point account, the present invention may also be implemented with reference to the foregoing steps (A2) to (D4), which is not limited in this embodiment of the present invention. When the present invention is implemented with reference to the foregoing steps (A2) to (D4), an existing wireless access process may be used.

In the method described in FIG. 2, operations such as manually enabling access point search and manually entering a password by a user can be avoided, so that efficiency in accessing an access point can be effectively improved.

Figure 3:
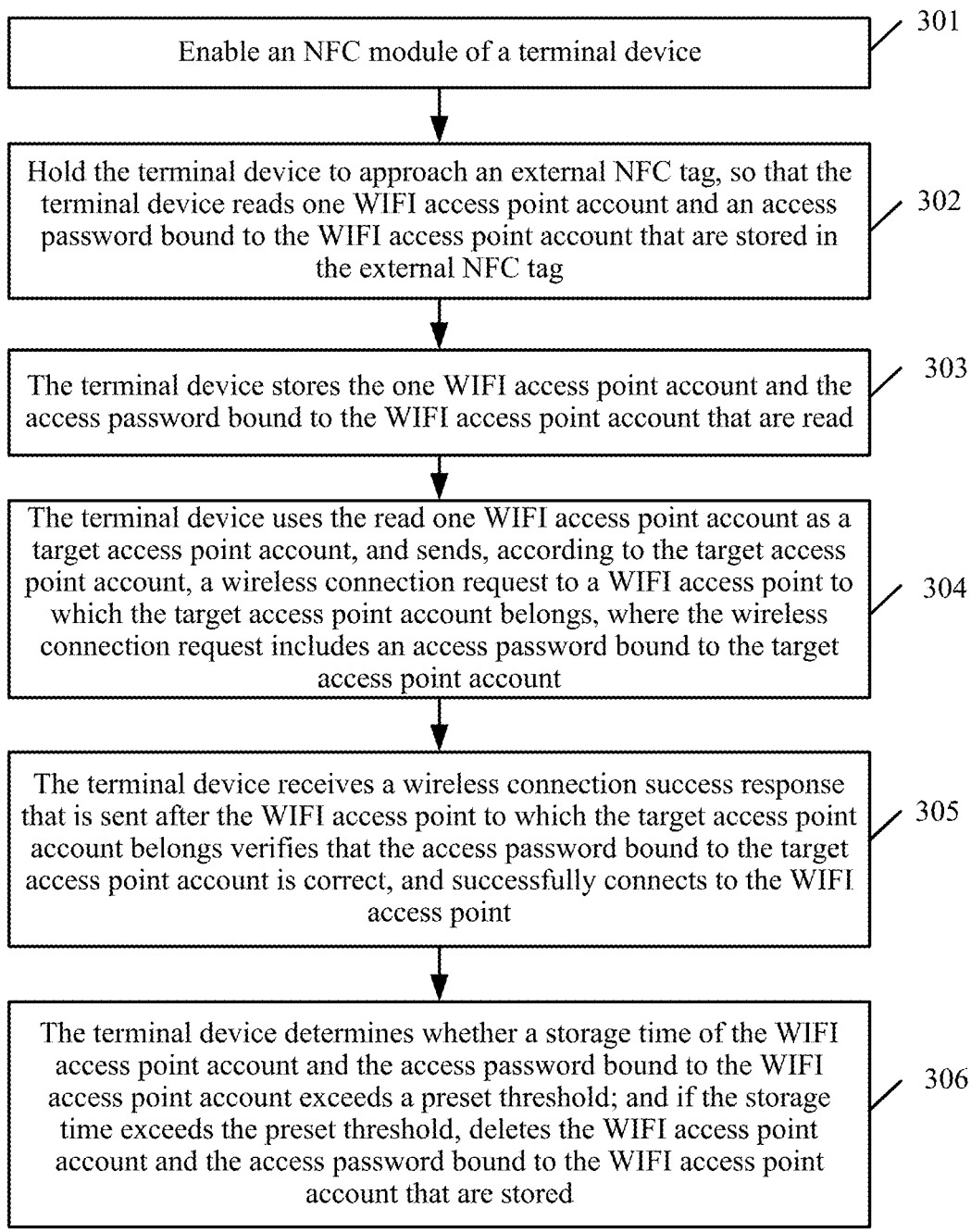
FIG. 3 is a schematic flowchart of another wireless access method according to an embodiment of the present invention.

Referring to FIG. 3, FIG. 3 is a schematic flowchart of another wireless access method according to an embodiment of the present invention. In the wireless access method shown in FIG. 3, it is assumed that an external NFC tag stores only one piece of WIFI access point information, where the WIFI access point information includes a WIFI access point account and an access password bound to the WIFI access point account. A wireless access process is the same when the NFC tag stores only one piece of Bluetooth access point information (including a Bluetooth access point account and an access password bound to the Bluetooth access point account), which is not repeated in this embodiment of the present invention.

In the wireless access method shown in FIG. 3, one WIFI access point account and an access password bound to the WIFI access point account may be written into the external NFC tag in advance, and the NFC tag may be attached at a fixed location.

In this embodiment of the present invention, a management user of a WIFI access point may write one WIFI access point account and an access password bound to the WIFI access point account into the external NFC tag. For example, the management user of the WIFI access point may access an NFC application of a smartphone, and after manually entering one WIFI access point account and an access password bound to the WIFI access point account into the NFC application, make the smartphone approach the external NFC tag, so as to write the one WIFI access point account and the access password bound to the WIFI access point account into the external NFC tag. Alternatively, the management user of the WIFI access point may access an NFC application of a smartphone, call, from the NFC application, one WIFI access point account and an access password bound to the WIFI access point account that have been stored in the smartphone, and then make the smartphone approach the external NFC tag, so as to write the one WIFI access point account and the access password bound to the WIFI access point account into the external NFC tag.

For example, the NFC tag may be attached at a fixed location in public places such as an airport, a mall, and a station, or the NFC tag may be attached at a fixed location in a house.

As shown in FIG. 3, the wireless access method may include the following steps:

301. Enable an NFC module of a terminal device.

302. Hold the terminal device to approach an external NFC tag, so that the terminal device reads one WIFI access point account and an access password bound to the WIFI access point account that are stored in the external NFC tag.

In this embodiment of the present invention, a user may hold the terminal device to approach the external NFC tag, so that the terminal device may read, by using the NFC module of the terminal device, the one WIFI access point account and the access password bound to the WIFI access point account that are stored in the external NFC tag.

303. The terminal device stores the one WIFI access point account and the access password bound to the WIFI access point account that are read.

304. The terminal device uses the read one WIFI access point account as a target access point account, and sends, according to the target access point account, a wireless connection request to a WIFI access point to which the target access point account belongs, where the wireless connection request includes an access password bound to the target access point account.

In this embodiment of the present invention, the terminal device may send, by using a WIFI module, the wireless connection request to the WIFI access point to which the target access point account belongs, where the wireless connection request includes the access password bound to the target access point account.

305. The terminal device receives a wireless connection success response that is sent after the WIFI access point to which the target access point account belongs verifies that the access password bound to the target access point account is correct, and successfully connects to the WIFI access point.

306. The terminal device determines whether a storage time of the WIFI access point account and the access password bound to the WIFI access point account exceeds a preset threshold (for example, two hours); and if the storage time exceeds the preset threshold, deletes the WIFI access point account and the access password bound to the WIFI access point account that are stored.

If the storage time does not exceed the preset threshold, the terminal device does not need to delete the WIFI access point account and the access password bound to the WIFI access point account that are stored.

In an implementation manner, alternatively, the terminal device may detect whether a wireless disconnection instruction entered by the user is received; and if the wireless disconnection instruction entered by the user is received, delete the WIFI access point account and the access password bound to the WIFI access point account that are stored; or if the wireless disconnection instruction entered by the user is not received, does not need to delete the WIFI access point account and the access password bound to the WIFI access point account that are stored.

In the method described in FIG. 3, a terminal device can not only complete automatic access to a WIFI access point, but also avoid operations of manually enabling access point search and manually entering a password by a user, so that efficiency in accessing the WIFI access point can be effectively improved.

Figure 4:
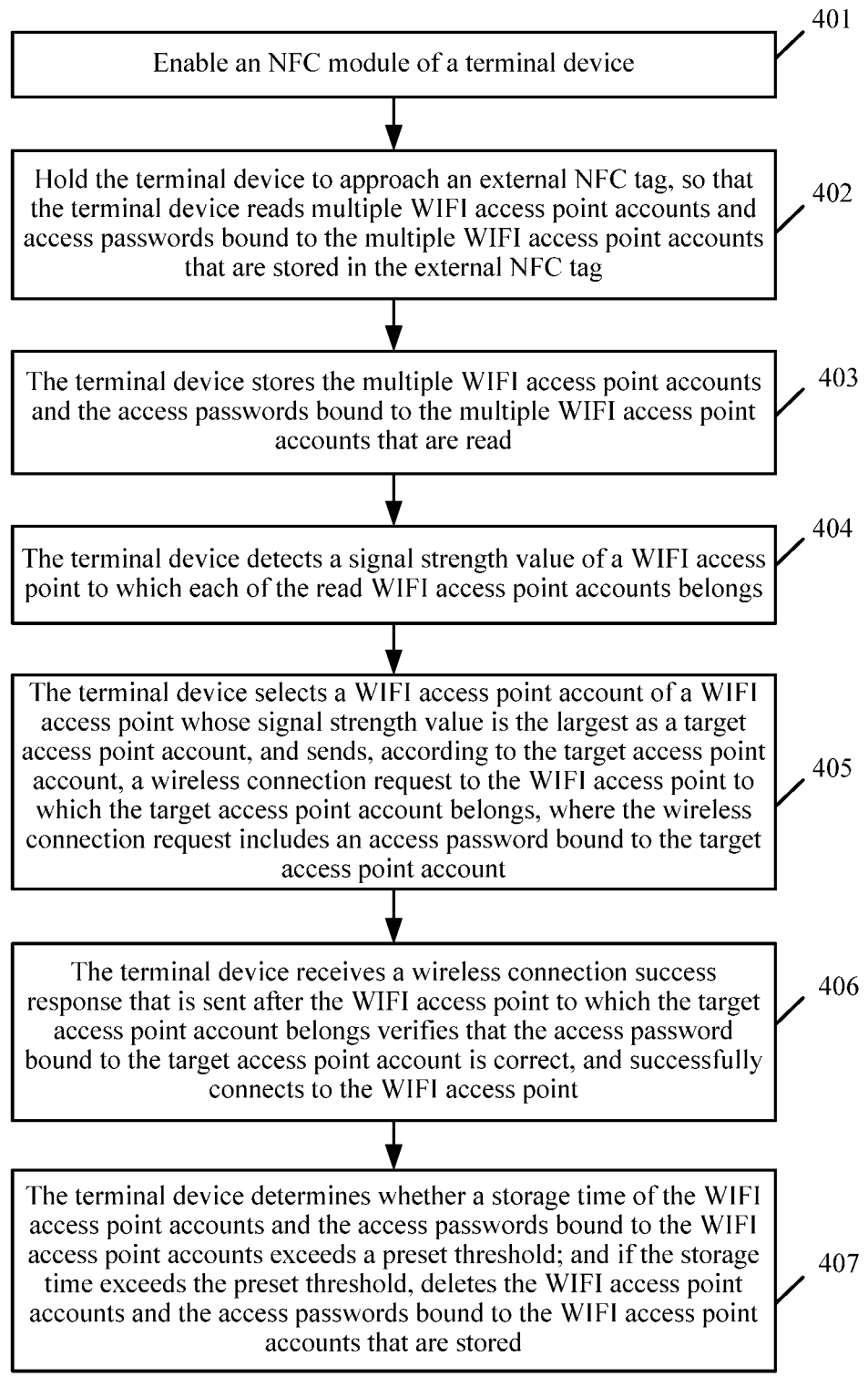
FIG. 4 is a schematic flowchart of another wireless access method according to an embodiment of the present invention.

Referring to FIG. 4, FIG. 4 is a schematic flowchart of another wireless access method according to an embodiment of the present invention. In the wireless access method shown in FIG. 4, it is assumed that an NFC tag stores only multiple pieces of WIFI access point information, where each piece of WIFI access point information includes a WIFI access point account and an access password bound to the WIFI access point account. A wireless access process is the same when the NFC tag stores multiple pieces of Bluetooth access point information (that is, each piece of Bluetooth access point information includes a Bluetooth access point account and an access password bound to the Bluetooth access point account) or when the NFC tag stores some pieces of Bluetooth access point information and some pieces of WIFI access point information, which is not repeated in this embodiment of the present invention.

In the wireless access method shown in FIG. 4, multiple WIFI access point accounts and access passwords bound to the multiple WIFI access point accounts may be written into an external NFC tag in advance, and the NFC tag may be attached at a fixed location.

In this embodiment of the present invention, a management user of a WIFI access point may write multiple WIFI access point accounts and access passwords bound to the multiple WIFI access point accounts into the external NFC tag. For example, the management user of the WIFI access point may access an NFC application of a smartphone, and after manually entering multiple WIFI access point accounts and access passwords bound to the multiple WIFI access point accounts into the NFC application, make the smartphone approach the external NFC tag, so as to write the multiple WIFI access point accounts and the access passwords bound to the multiple WIFI access point accounts into the external NFC tag. Alternatively, the management user of the WIFI access point may access an NFC application of a smartphone, call, from the NFC application, multiple WIFI access point accounts and access passwords bound to the multiple WIFI access point accounts that have been stored in the smartphone, and then make the smartphone approach the external NFC tag, so as to write the multiple WIFI access point accounts and the access passwords bound to the multiple WIFI access point accounts into the external NFC tag.

For example, the NFC tag may be attached at a fixed location in public places such as an airport, a mall, and a station, or the NFC tag may be attached at a fixed location (for example, a wall) in a house.

As shown in FIG. 4, the wireless access method may include the following steps:

401. Enable an NFC module of a terminal device.

402. Hold the terminal device to approach an external NFC tag, so that the terminal device reads multiple WIFI access point accounts and access passwords bound to the multiple WIFI access point accounts that are stored in the external NFC tag.

In this embodiment of the present invention, a user may hold the terminal device to approach the external NFC tag, so that the terminal device may read, by using the NFC module of the terminal device, the multiple WIFI access point accounts and the access passwords bound to the multiple WIFI access point accounts that are stored in the external NFC tag.

403. The terminal device stores the multiple WIFI access point accounts and the access passwords bound to the multiple WIFI access point accounts that are read.

404. The terminal device detects a signal strength value of a WIFI access point to which each of the read WIFI access point accounts belongs.

The signal strength value of the WIFI access point is generally represented in units of dB.

405. The terminal device selects a WIFI access point account of a WIFI access point whose signal strength value is the largest as a target access point account, and sends, according to the target access point account, a wireless connection request to the WIFI access point to which the target access point account belongs, where the wireless connection request includes an access password bound to the target access point account.

For example, it is assumed that in step 404, the terminal device detects that a signal strength value of a WIFI access point to which a WIFI access point account TP-LINK1 belongs is −70 dB, a signal strength value of a WIFI access point to which a WIFI access point account TP-LINK2 belongs is −60 dB, and a signal strength value of a WIFI access point to which a WIFI access point account TP-LINK3 belongs is −50 dB; in step 405, the terminal device may select the WIFI access point account TP-LINK1 of the WIFI access point whose signal strength value is the largest as the target access point account.

In this embodiment of the present invention, by performing step 404 and step 405, the terminal device can automatically select, in the background, the WIFI access point account of the WIFI access point whose signal strength value is the largest as the target access point account.

In this embodiment of the present invention, the terminal device may send, by using a WIFI module, the wireless connection request to the WIFI access point to which the target access point account belongs, where the wireless connection request includes the access password bound to the target access point account.

406. The terminal device receives a wireless connection success response that is sent after the WIFI access point to which the target access point account belongs verifies that the access password bound to the target access point account is correct, and successfully connects to the WIFI access point.

407. The terminal device determines whether a storage time of the WIFI access point accounts and the access passwords bound to the WIFI access point accounts exceeds a preset threshold (for example, two hours); and if the storage time exceeds the preset threshold, deletes the WIFI access point accounts and the access passwords bound to the WIFI access point accounts that are stored.

If the storage time does not exceed the preset threshold, the terminal device does not need to delete the WIFI access point accounts and the access passwords bound to the WIFI access point accounts that are stored.

In an implementation manner, alternatively, the terminal device may detect whether a wireless disconnection instruction entered by the user is received; and if the wireless disconnection instruction entered by the user is received, delete the WIFI access point accounts and the access passwords bound to the WIFI access point accounts that are stored; or if the wireless disconnection instruction entered by the user is not received, does not need to delete the WIFI access point accounts and the access passwords bound to the WIFI access point accounts that are stored.

In the method described in FIG. 4, a terminal device can not only complete automatic access to a WIFI access point, but also avoid operations of manually enabling access point search and manually entering a password by a user, so that efficiency in accessing the WIFI access point can be effectively improved.

Figure 5:
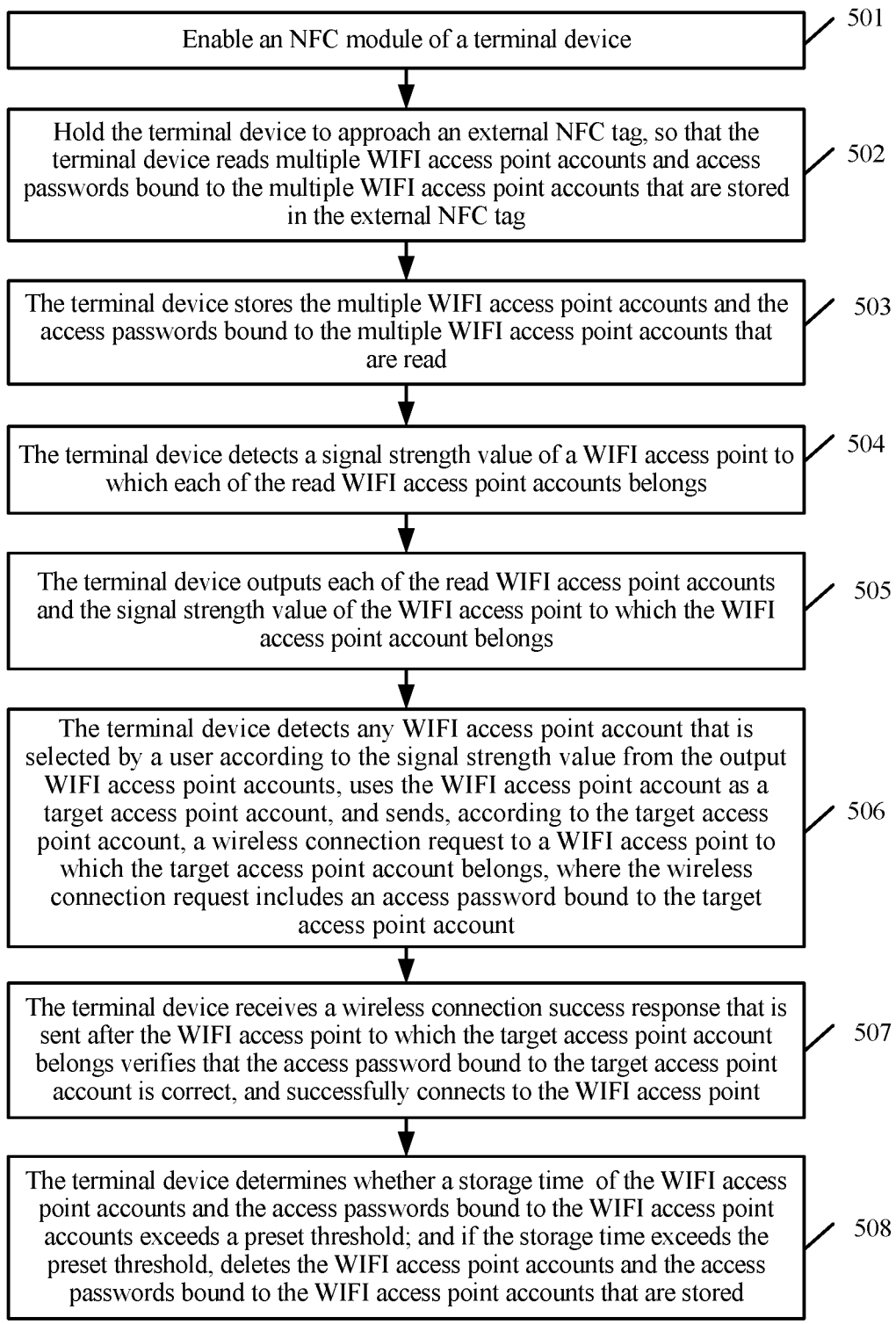
FIG. 5 is a schematic flowchart of another wireless access method according to an embodiment of the present invention.

Referring to FIG. 5, FIG. 5 is a schematic flowchart of another wireless access method according to an embodiment of the present invention. In the wireless access method shown in FIG. 5, it is assumed that an NFC tag stores only multiple pieces of WIFI access point information, where each piece of WIFI access point information includes a WIFI access point account and an access password bound to the WIFI access point account. A wireless access process is the same when the NFC tag stores multiple pieces of Bluetooth access point information (that is, each piece of Bluetooth access point information includes a Bluetooth access point account and an access password bound to the Bluetooth access point account) or when the NFC tag stores some pieces of Bluetooth access point information and some pieces of WIFI access point information, which is not repeated in this embodiment of the present invention.

In the wireless access method shown in FIG. 5, multiple WIFI access point accounts and access passwords bound to the multiple WIFI access point accounts may be written into an external NFC tag in advance, and the NFC tag may be attached at a fixed location.

As shown in FIG. 5, the wireless access method may include the following steps,

501. Enable an NFC module of a terminal device.

502. Hold the terminal device to approach an external NFC tag, so that the terminal device reads multiple WIFI access point accounts and access passwords bound to the multiple WIFI access point accounts that are stored in the external NFC tag.

In this embodiment of the present invention, a user may hold the terminal device to approach the external NFC tag, so that the terminal device may read, by using the NFC module of the terminal device, the multiple WIFI access point accounts and the access passwords bound to the multiple WIFI access point accounts that are stored in the external NFC tag.

503. The terminal device stores the multiple WIFI access point accounts and the access passwords bound to the multiple WIFI access point accounts that are read.

504. The terminal device detects a signal strength value of a WIFI access point to which each of the read WIFI access point accounts belongs.

505. The terminal device outputs each of the read WIFI access point accounts and the signal strength value of the WIFI access point to which the WIFI access point account belongs.

506. The terminal device detects any WIFI access point account that is selected by a user according to the signal strength value from the output WIFI access point accounts, uses the WIFI access point account as a target access point account, and sends, according to the target access point account, a wireless connection request to a WIFI access point to which the target access point account belongs, where the wireless connection request includes an access password bound to the target access point account.

Figure 6:
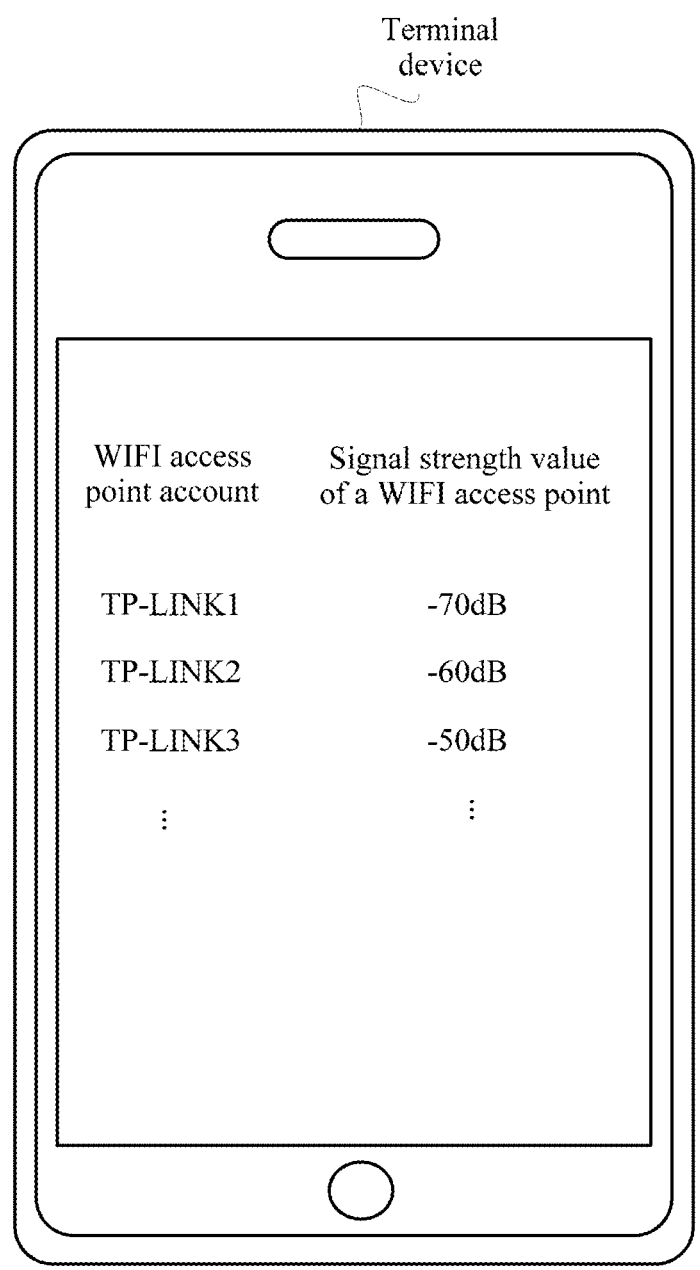
FIG. 6 is a schematic interface diagram of a WIFI access point account and a signal strength value of a WIFI access point to which the WIFI access point account belongs that are output by a terminal device according to an embodiment of the present invention.

For example, it is assumed that in step 504, the terminal device detects that a signal strength value of a WIFI access point to which a WIFI access point account TP-LINK1 belongs is −70 dB, a signal strength value of a WIFI access point to which a WIFI access point account TP-LINK2 belongs is −60 dB, and a signal strength value of a WIFI access point to which a WIFI access point account TP-LINK3 belongs is −50 dB; in step 505, the terminal device may output each of the WIFI access point accounts and a signal strength value of a WIFI access point to which the WIFI access point account belongs, as shown in FIG. 6. Correspondingly, in step 506, the terminal device may detect any WIFI access point account that is selected by the user according to the signal strength value shown in FIG. 6 from the WIFI access point accounts output by the terminal device, and use the WIFI access point account as the target access point account. For example, the terminal device may detect the WIFI access point account TP-LINK2 that is selected by the user according to the signal strength value −60 dB shown in FIG. 6 from the WIFI access point accounts output by the terminal device, and use the WIFI access point account TP-LINK2 as the target access point account.

In this embodiment of the present invention, by performing steps 504 to 506, the user can select a desirable WIFI access point account as the target access point account.

In an embodiment, alternatively, the user may not consider a selection basis of a signal strength value, and may select any WIFI access point account from the WIFI access point accounts output by the terminal device. Correspondingly, in step 506, the terminal device may detect any WIFI access point account that is selected by the user from the WIFI access point accounts output by the terminal device, and use the WIFI access point account as the target access point account.

In this embodiment of the present invention, a purpose of outputting, by the terminal device, the signal strength value of the WIFI access point to which the WIFI access point account belongs is to provide a selection basis for the user to select a WIFI access point account. Certainly, the user may ignore such a selection basis and may directly select any WIFI access point account (that is, a WIFI access point name).

In this embodiment of the present invention, the terminal device may send, by using a WIFI module, the wireless connection request to the WIFI access point to which the target access point account belongs, where the wireless connection request includes the access password bound to the target access point account.

507. The terminal device receives a wireless connection success response that is sent after the WIFI access point to which the target access point account belongs verifies that the access password bound to the target access point account is correct, and successfully connects to the WIFI access point.

508. The terminal device determines whether a storage time of the WIFI access point accounts and the access passwords bound to the WIFI access point accounts exceeds a preset threshold (for example, two hours); and if the storage time exceeds the preset threshold, deletes the WIFI access point accounts and the access passwords bound to the WIFI access point accounts that are stored.

In an implementation manner, alternatively, the terminal device may detect whether a wireless disconnection instruction entered by the user is received; and if the wireless disconnection instruction entered by the user is received, delete the WIFI access point accounts and the access passwords bound to the WIFI access point accounts that are stored.

In the method described in FIG. 5, a terminal device can not only complete automatic access to a WIFI access point, but also avoid operations of manually enabling access point search and manually entering a password by a user, so that efficiency in accessing the WIFI access point can be effectively improved.

Figure 7:
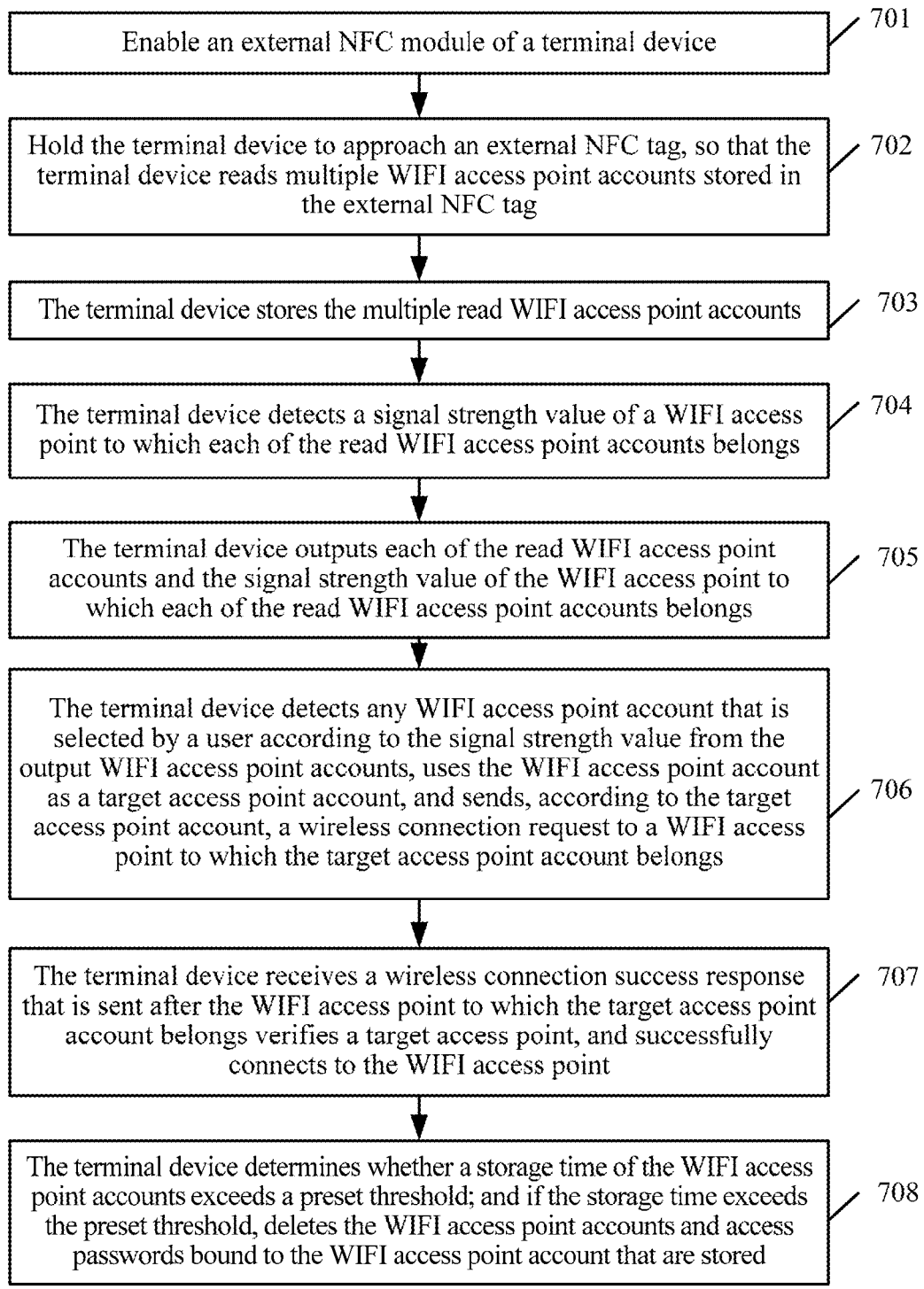
FIG. 7 is a schematic flowchart of another wireless access method according to an embodiment of the present invention.

Referring to FIG. 7, FIG. 7 is a schematic flowchart of another wireless access method according to an embodiment of the present invention. In the wireless access method shown in FIG. 7, it is assumed that an NFC tag stores only multiple pieces of WIFI access point information, where each piece of WIFI access point information includes only a WIFI access point account. In the wireless access method shown in FIG. 7, multiple WIFI access point accounts may be written into an external NFC tag in advance, and the NFC tag may be attached at a fixed location.

As shown in FIG. 7, the wireless access method may include the following steps:

701. Enable an external NFC module of a terminal device.

702. Hold the terminal device to approach an external NFC tag, so that the terminal device reads multiple WIFI access point accounts stored in the external NFC tag.

In this embodiment of the present invention, a user may hold the terminal device to approach the external NFC tag, so that the terminal device may read, by using the NFC module of the terminal device, the multiple WIFI access point accounts stored in the external NFC tag.

703. The terminal device stores the multiple read WIFI access point accounts.

704. The terminal device detects a signal strength value of a WIFI access point to which each of the read WIFI access point accounts belongs.

705. The terminal device outputs each of the read WIFI access point accounts and the signal strength value of the WIFI access point to which each of the read WIFI access point accounts belongs.

706. The terminal device detects any WIFI access point account that is selected by a user according to the signal strength value from the output WIFI access point accounts, uses the WIFI access point account as a target access point account, and sends, according to the target access point account, a wireless connection request to a WIFI access point to which the target access point account belongs.

In this embodiment of the present invention, by performing steps 704 to 706, the user can select a desirable WIFI access point account as the target access point account.

In an embodiment, alternatively, the user may not consider a selection basis of a signal strength value, and may select any WIFI access point account from the WIFI access point accounts output by the terminal device. Correspondingly, in step 706, the terminal device may detect any WIFI access point account that is selected by the user from the WIFI access point accounts output by the terminal device, and use the WIFI access point account as the target access point account.

In this embodiment of the present invention, the terminal device may send, by using a WIFI module, the wireless connection request to the WIFI access point to which the target access point account belongs, where the wireless connection request includes an access password bound to the target access point account.

707. The terminal device receives a wireless connection success response that is sent after the WIFI access point to which the target access point account belongs verifies a target access point, and successfully connects to the WIFI access point.

708. The terminal device determines whether a storage time of the WIFI access point accounts exceeds a preset threshold (for example, two hours); and if the storage time exceeds the preset threshold, deletes the WIFI access point accounts and access passwords bound to the WIFI access point accounts that are stored.

In an implementation manner, alternatively, the terminal device may detect whether a wireless disconnection instruction entered by the user is received; and if the wireless disconnection instruction entered by the user is received, delete the stored WIFI access point accounts.

In the method described in FIG. 7, a terminal device can not only complete automatic access to a WIFI access point, but also avoid operations of manually enabling access point search and manually entering a password by a user, so that efficiency in accessing the WIFI access point can be effectively improved.

Figure 8:
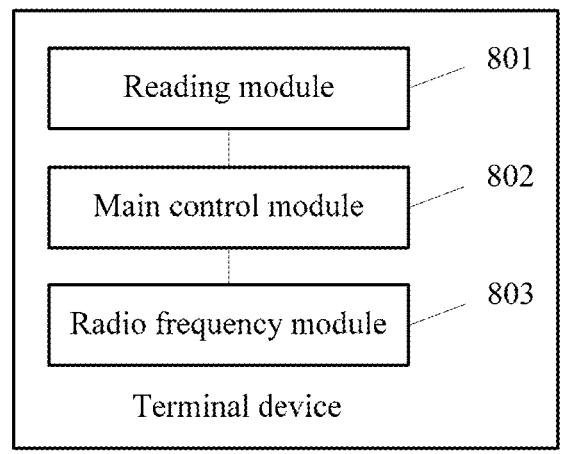
FIG. 8 is a schematic structural diagram of a terminal device according to an embodiment of the present invention.

Referring to FIG. 8, FIG. 8 is a schematic structural diagram of a terminal device according to an embodiment of the present invention. As shown in FIG. 8, the terminal device may include a reading module 801, configured to read access point information stored in an external NFC tag. The terminal device may also include a main control module 802, configured to: acquire one piece of target access point information according to the access point information read by the reading module 801, and output the one piece of target access point information to a radio frequency module 803. The terminal device may also include the radio frequency module 803, configured to establish, according to the target access point information output by the main control module 802, a wireless connection to an access point to which the target access point information belongs.

In this embodiment of the present invention, in physical implementation, the reading module 801 may be implemented by an NFC module; in physical implementation, the main control module 802 may be implemented by hardware such as a processor or a CPU; and in physical implementation, the radio frequency module 803 may be implemented by hardware such as a communication unit.

In this embodiment of the present invention, the terminal device described in FIG. 8 can not only complete automatic access to an access point, but also avoid operations of manually enabling access point search and manually entering a password by a user, so that efficiency in accessing the access point can be effectively improved.

Figure 9:
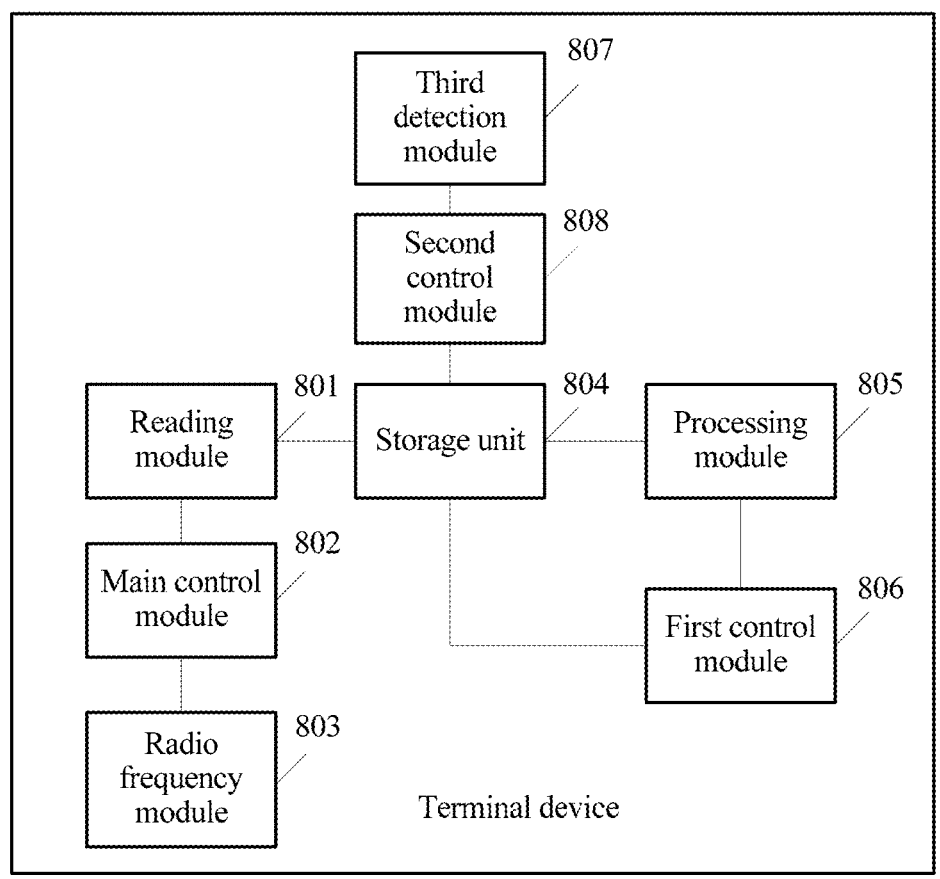
FIG. 9 is a schematic structural diagram of another terminal device according to an embodiment of the present invention.

Referring to FIG. 9 together, FIG. 9 is a schematic structural diagram of another terminal device according to an embodiment of the present invention. The terminal device shown in FIG. 9 is obtained by optimizing the terminal device shown in FIG. 8. Compared with the terminal device shown in FIG. 8, the terminal device shown in FIG. 9 may further include: a storage module 804, configured to store the access point information read by the reading module 801.

In physical implementation, the storage module 804 may be implemented by various storage mediums.

In an optional implementation manner, the terminal device shown in FIG. 9 may further include: a processing module 805, configured to: determine whether a storage time for storing the access point information by the storage module 804 exceeds a preset threshold; and if the storage time exceeds the preset threshold, enable a first control module 806. The terminal device may further include the first control module 806, configured to delete the access point information stored by the storage module 805.

That is, after the processing module 805 is enabled, the first control module 806 may delete the access point information stored by the storage module 805. However, when the processing module 805 determines that the storage time for storing the access point information by the storage module 804 does not exceed the preset threshold, the processing module 805 does not need to enable the first control module 806, and the first control module 806 does not need to delete the access point information stored by the storage module 805 either.

In this embodiment of the present invention, in physical implementation, both the processing module 805 and the first control module 806 may be implemented by hardware such as a processor or a CPU.

In another optional implementation manner, the terminal device shown in FIG. 9 may further include: a third detection module 807, configured to: detect whether a wireless disconnection instruction entered by the user is received; and if the wireless disconnection instruction entered by the user is received, enable a second control module 808. The terminal device may further include the second control module 808, configured to delete the access point information stored by the storage module 805.

That is, after the third detection module 807 is enabled, the second control module 808 may delete the access point information stored by the storage module 805. However, when the third detection module 807 detects that the wireless disconnection instruction entered by the user is not received, the third detection module 807 does not need to enable the second control module 808, and the second control module 808 does not need to delete the access point information stored by the storage module 805 either.

In this embodiment of the present invention, in physical implementation, the third detection module 807 may be implemented by hardware such as a detector or a sensor, and in physical implementation, the second control module 808 may be implemented by hardware such as a processor or a CPU.

It should be noted that among the foregoing processing module 805, first control module 806, third detection module 807, and second control module 808, only the processing module 805 and the first control module 806 may exist, or only the third detection module 807 and the second control module 808 may exist, or the processing module 805, the first control module 806, the third detection module 807, and the second control module 808 may coexist, which is not limited in this embodiment of the present invention.

Figure 10:
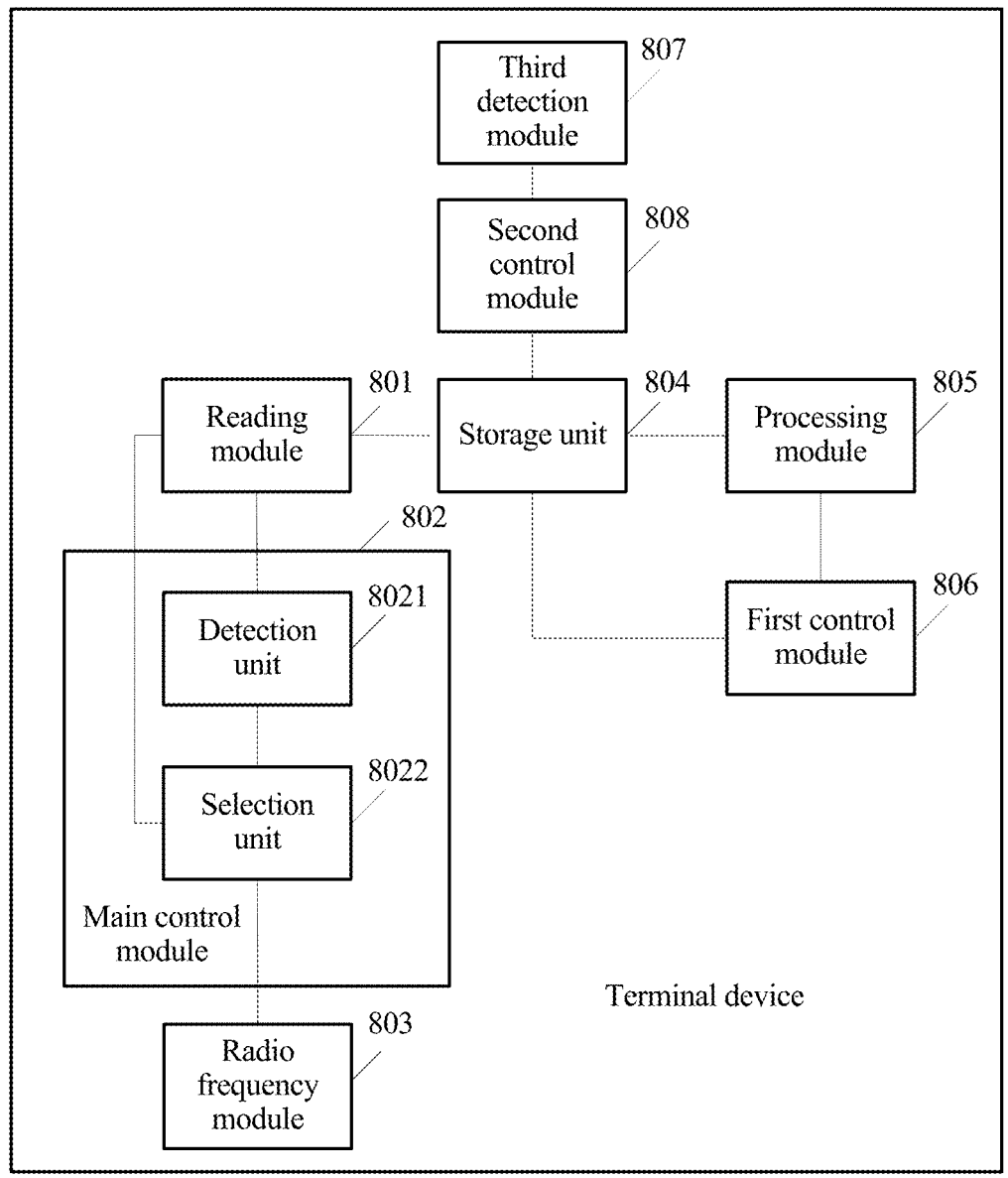
FIG. 10 is a schematic structural diagram of another terminal device according to an embodiment of the present invention.

Referring to FIG. 10 together, FIG. 10 is a schematic structural diagram of another terminal device according to an embodiment of the present invention. The terminal device shown in FIG. 10 is obtained by optimizing the terminal device shown in FIG. 9. Compared with the terminal device shown in FIG. 9, in the terminal device shown in FIG. 10, the main control module 802 includes: a detection unit 8021, configured to: detect a signal strength value of an access point to which each piece of the access point information read by the reading module 801 belongs, and output the signal strength value to a selection unit 8022; and the selection unit 8022, configured to: select, from the access point information read by the reading module 801 and according to the signal strength value that is of the access point to which each piece of the access point information belongs and that is output by the detection unit 8021, access point information of an access point whose signal strength value is the largest as the target access point information, and output the target access point information to the radio frequency module 803.

By using the detection unit 8021 and the selection unit 8022, the terminal device can automatically select, in the background, the access point information of the access point whose signal strength value is the largest as the target access point information.

In this embodiment of the present invention, the detection unit 8021 may be implemented by hardware such as a detector, and the selection unit 8022 may be implemented by hardware such as a processor or a CPU.

Figure 11:
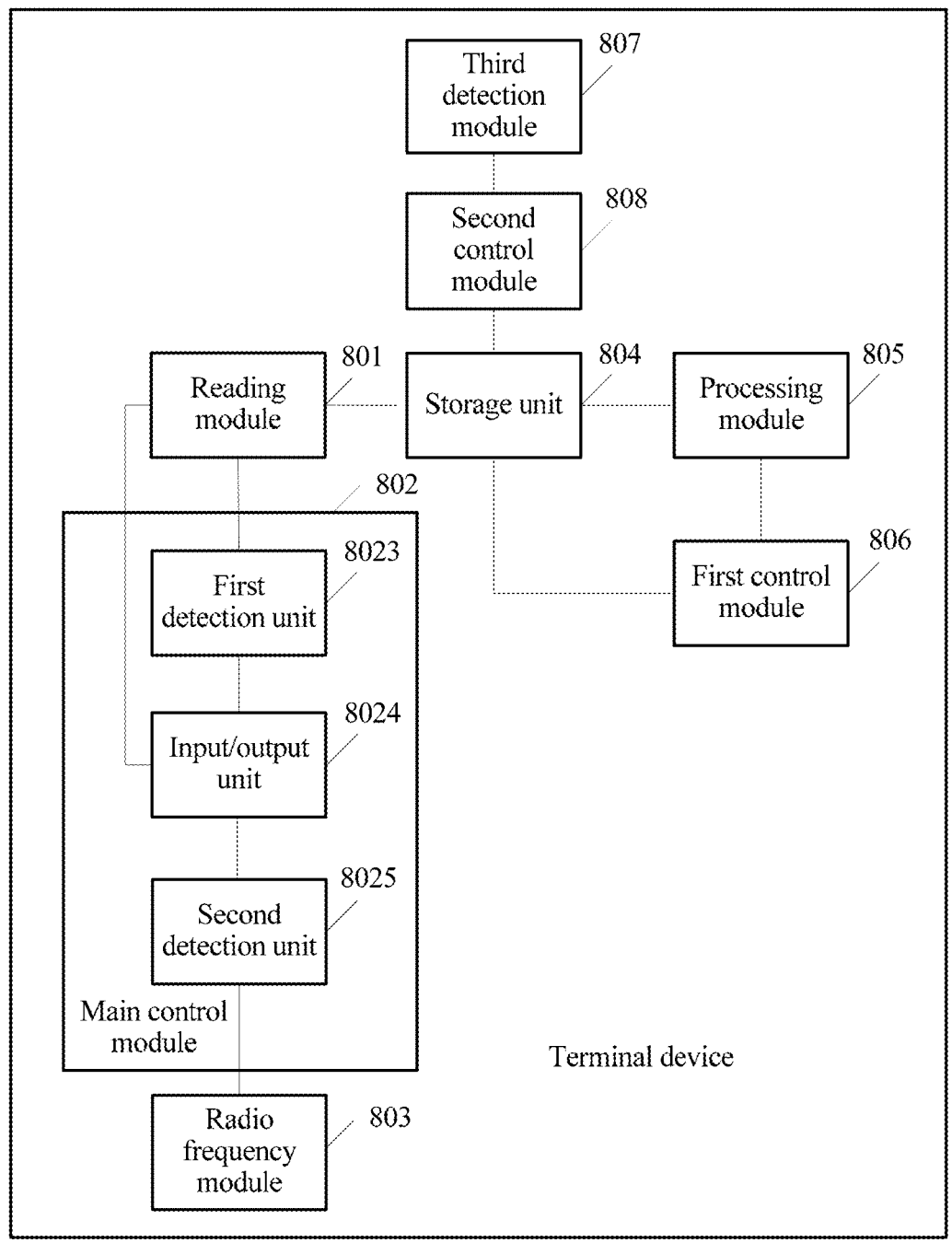
FIG. 11 is a schematic structural diagram of another terminal device according to an embodiment of the present invention.

Referring to FIG. 11 together, FIG. 11 is a schematic structural diagram of another terminal device according to an embodiment of the present invention. The terminal device shown in FIG. 11 is obtained by optimizing the terminal device shown in FIG. 9. Compared with the terminal device shown in FIG. 9, in the terminal device shown in FIG. 11, the main control module 802 includes: a first detection unit 8023, configured to: detect a signal strength value of an access point to which each piece of the access point information read by the reading module 801 belongs, and output the signal strength value to an input/out unit 8024; the input/output unit 8024, configured to output each piece of the access point information read by the reading module 801 and the signal strength value that is of the access point to which the access point information belongs and that is detected by the first detection unit 8023; and a second detection unit 8025, configured to: detect one piece of target access point information that is selected by a user according to the signal strength value from the access point information output by the input/output unit 8024, and output the one piece of target access point information to the radio frequency module 803.

By using the first detection unit 8023, the input/output unit 8024, and the second detection unit 8025, the user can select desirable access point information as a target access point account.

In this embodiment of the present invention, the first detection unit 8023 may be implemented by hardware such as a detector, the input/output unit 8024 may be implemented by hardware such as a touchscreen, and the second detection unit 8025 may also be implemented by hardware such as a detector.

In this embodiment of the present invention, the foregoing access point information may be one or more pieces of WIFI access point information and Bluetooth access point information. The access point information may include only an access point account, or include an access point account and an access password bound to the access point account, which is not limited in this embodiment of the present invention.

In this embodiment of the present invention, when the access point information includes only an access point account, the foregoing radio frequency module 803 may send, according to a target access point account output by the main control module 802, a wireless connection request to an access point to which the target access point account belongs; and receive a wireless connection success response sent by the access point to which the target access point account belongs, so as to implement a wireless connection between the terminal device and the access point to which the target access point account belongs.

Figure 12:
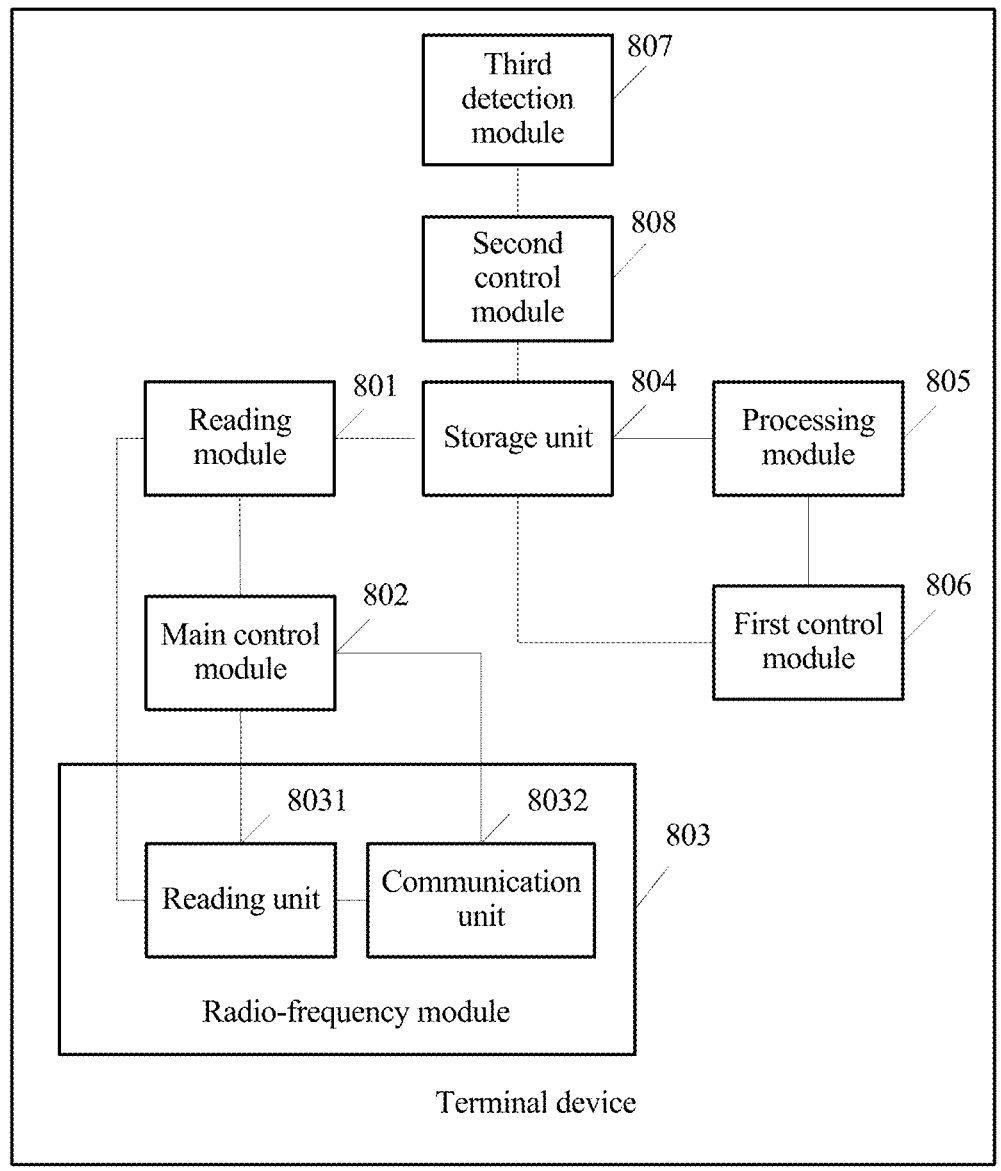
FIG. 12 is a schematic structural diagram of another terminal device according to an embodiment of the present invention.

Referring to FIG. 12 together, FIG. 12 is a schematic structural diagram of another terminal device according to an embodiment of the present invention. The terminal device shown in FIG. 12 is obtained by optimizing the terminal device shown in FIG. 9. In the terminal device shown in FIG. 12, if the access point information includes an access point account and an access password bound to the access point account, the radio frequency module 803 may include: a reading unit 8031, configured to: read, from the reading module 801 according to a target access point account output by the main control module 802, an access password bound to the target access point account, and output the access password to a communication unit 8032; and the communication unit 8032, configured to: send, according to a target access point account output by the main control module 802, a wireless connection request to an access point to which the target access point account belongs, where the wireless connection request includes the access password that is bound to the target access point account and that is output by the reading unit 8031; and receive a wireless connection success response that is sent after the access point to which the target access point account belongs verifies that the access password bound to the target access point account is correct, so as to implement a wireless connection between the terminal device and the access point to which the target access point account belongs.

In the terminal device shown in FIG. 12, the reading unit 8031 may be implemented by hardware such as a processor or a CPU, and the communication unit 8032 may be implemented by hardware such as an existing communication unit or communication module.

It should be noted that, a structure and a function of the main control module 802 in the terminal device shown in FIG. 12 may be the same as a structure and a function of the main control module 802 in the terminal device shown in FIG. 10 or FIG. 11, which is not repeated in this embodiment of the present invention.

Figure 13:
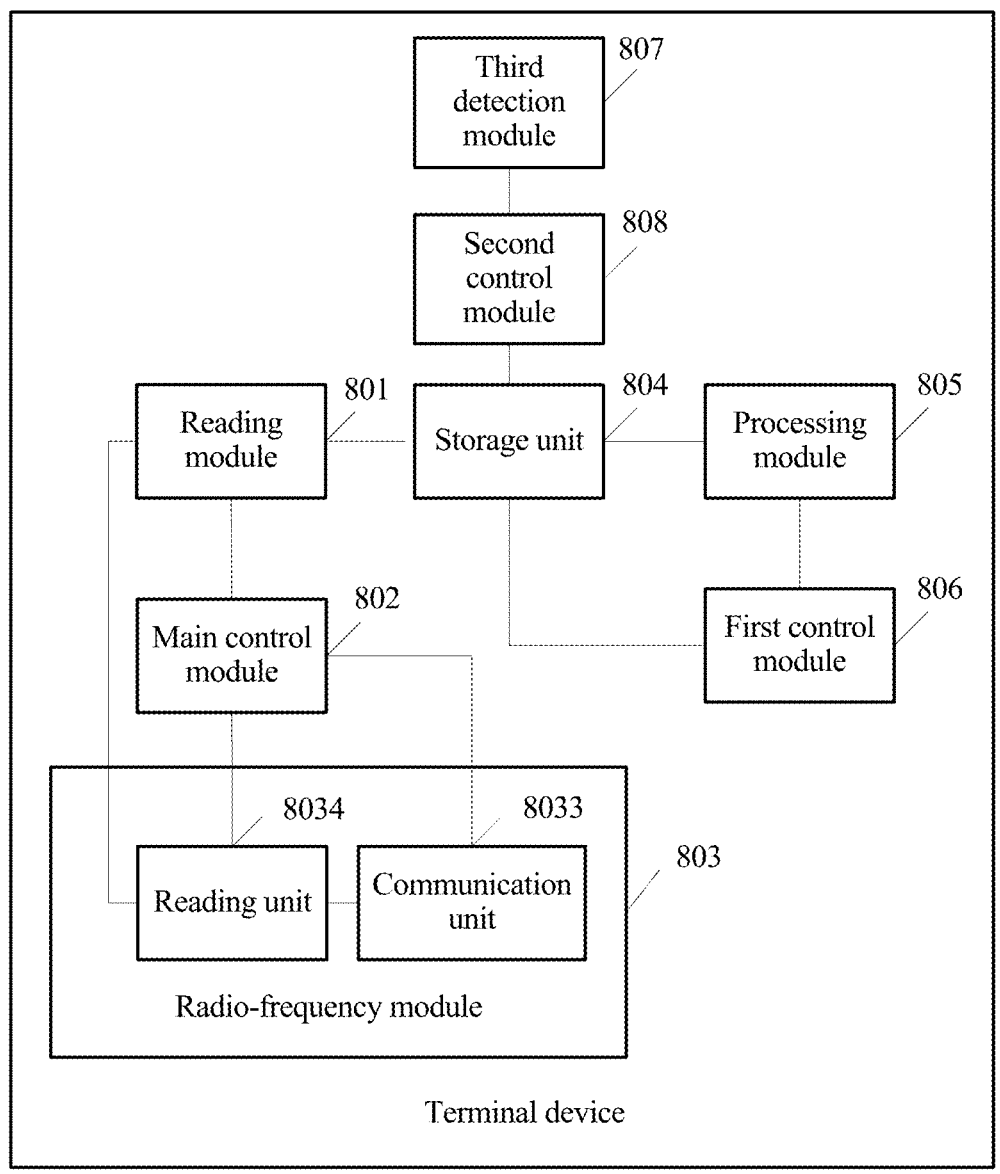
FIG. 13 is a schematic structural diagram of another terminal device according to an embodiment of the present invention.

Referring to FIG. 13 together, FIG. 13 is a schematic structural diagram of another terminal device according to an embodiment of the present invention. The terminal device shown in FIG. 13 is obtained by optimizing the terminal device shown in FIG. 9. In the terminal device shown in FIG. 13, if the access point information includes an access point account and an access password bound to the access point account, the radio frequency module 803 may include: a communication unit 8033, configured to: send, according to a target access point account output by the main control module 802, a wireless connection request to an access point to which the target access point account belongs; receive prompt information sent by the access point to which the target access point account belongs; and enable a reading unit 8034, where the prompt information is used to prompt sending of the access password bound to the target access point account; and the reading unit 8034, configured to: read, from the reading module 801 according to the target access point account output by the main control module 802, the access password bound to the target access point account, and output the access password to the communication unit 8033; where the communication unit 8033 is further configured to: send the access password bound to the target access point account to the access point to which the target access point account belongs; and receive a wireless connection success response that is sent after the access point to which the target access point account belongs verifies that the access password bound to the target access point account is correct, so as to implement a wireless connection between the terminal device and the access point to which the target access point account belongs.

In the terminal device shown in FIG. 13, the reading unit 8034 may be implemented by hardware such as a processor or a CPU, and the communication unit 8033 may be implemented by hardware such as an existing communication unit or communication module.

It should be noted that, a structure and a function of the main control module 802 in the terminal device shown in FIG. 13 may be the same as a structure and a function of the main control module 802 in the terminal device shown in FIG. 10 or FIG. 11, which is not repeated in this embodiment of the present invention.

In the terminal device described in FIG. 8 to FIG. 13, the terminal device can not only complete automatic access to an access point, but also avoid operations of manually enabling access point search and manually entering a password by a user, so that efficiency in accessing the access point can be effectively improved.

Figure 14:
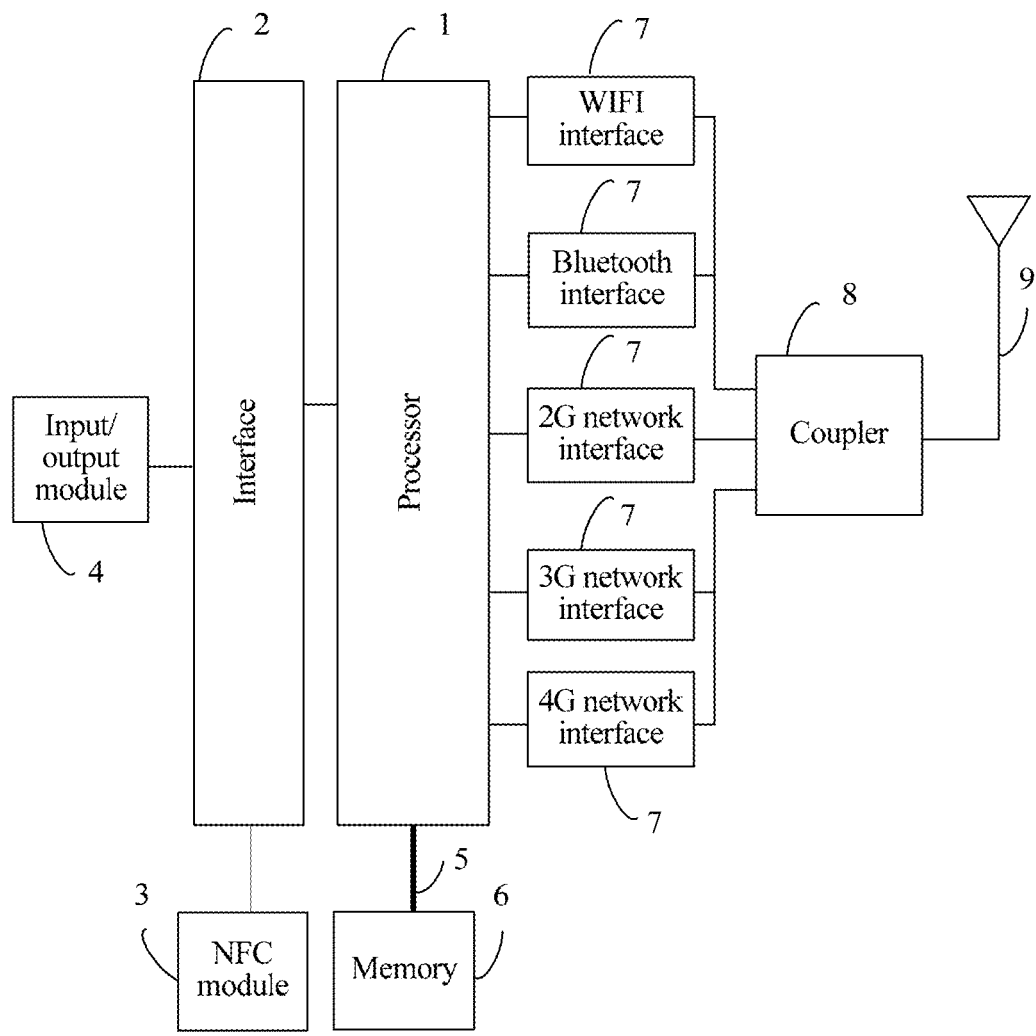
FIG. 14 is a schematic structural diagram of another terminal device according to an embodiment of the present invention.

Referring to FIG. 14, FIG. 14 is a schematic structural diagram of another terminal device according to an embodiment of the present invention. The terminal device shown in FIG. 14 may include: a processor 1; an NFC module 3 and an input/output module 4 that are connected to the processor 1 by using an interface 2; a memory 6 that is connected to the processor 1 by using a bus 5; a coupler 8 that is connected to the processor 1 by using multiple network interfaces 7; and an antenna module 9 that is connected to the coupler 8. The multiple network interfaces 7 may include several different interfaces such as a WIFI interface, a Bluetooth interface, a 2G network interface, a 3G network interface, and a 4G network interface, which is not limited in this embodiment of the present invention. In an uplink process, output of the network interface 7 is coupled by the coupler 8 to the antenna module 9 for transmission, and the uplink process and a downlink process are reversible. The memory 6 is configured to store a group of program code, and the processor 1 is configured to invoke the program code stored in the memory 6, so as to execute the following operations: controlling the NFC module 3 to read access point information stored in an external NFC tag; and acquiring one piece of target access point information according to the read access point information, and establishing, according to the target access point information, a wireless connection between the antenna module 9 and an access point to which the target access point information belongs.

In an optional implementation manner, a manner in which the processor 1 acquires the one piece of target access point information according to the read access point information may be: controlling the antenna module to detect a signal of an access point to which each piece of the read access point information belongs; calculating a signal strength value that is of the access point to which each piece of the access point information belongs and that is detected by the antenna module 9; and selecting access point information of an access point whose signal strength value is the largest as the target access point information.

In another optional implementation manner, a manner in which the processor 1 acquires the one piece of target access point information according to the read access point information may be: controlling the antenna module 9 to detect a signal of an access point to which each piece of the read access point information belongs; calculating a signal strength value that is of the access point to which each piece of the access point information belongs and that is detected by the antenna module 9; controlling the input/output module 4 to output each piece of the access point information and the signal strength value that is of the access point to which the access point information belongs and that is obtained by means of calculation; and controlling the input/output module 4 to detect any piece of access point information that is selected by a user according to the signal strength value from the access point information output by the input/output module 4, and use the piece of access point information as the target access point information.

In another optional implementation manner, the foregoing access point information includes an access point account. Correspondingly, a manner in which the processor 1 establishes, according to the target access point information, the wireless connection between the antenna module 9 and the access point to which the target access point information belongs may be specifically: controlling the antenna module 9 to send, according to a target access point account, a wireless connection request to an access point to which the target access point account belongs, so that the antenna module 9 receives a wireless connection success response sent by the access point to which the target access point account belongs.

In another optional implementation manner, the foregoing access point information includes an access point account and an access password bound to the access point account. Correspondingly, a manner in which the processor 1 establishes, according to the target access point information, the wireless connection between the antenna module 9 and the access point to which the target access point information belongs may be specifically: controlling the antenna module 9 to send, according to a target access point account, a wireless connection request to an access point to which the target access point account belongs, where the wireless connection request includes an access password bound to the target access point account, so that the antenna module 9 receives a wireless connection success response that is sent after the access point to which the target access point account belongs verifies that the access password bound to the target access point account is correct.

In another optional implementation manner, when the foregoing access point information includes an access point account and an access password bound to the access point account, a manner in which the processor 1 establishes, according to the target access point information, the wireless connection between the antenna module 9 and the access point to which the target access point information belongs may be specifically: controlling the antenna module 9 to send, according to a target access point account, a wireless connection request to an access point to which the target access point account belongs, so that the antenna module 9 receives prompt information sent by the access point to which the target access point account belongs, where the prompt information is used to prompt sending of an access password bound to the target access point account, and so that the antenna module 9 sends the access password bound to the target access point account to the access point to which the target access point account belongs and receives a wireless connection success response that is sent after the access point to which the target access point account belongs verifies that the access password bound to the target access point account is correct.

In an optional implementation manner, the processor 1 further executes the following operation: controlling the memory 6 to store the read access point information.

In an optional implementation manner, the processor 1 further executes the following operations: determining whether a storage time of the access point information stored by the memory 6 exceeds a preset threshold; and if the storage time exceeds the preset threshold, controlling the memory 6 to delete the stored access point information.

In an optional implementation manner, the processor 1 further executes the following operations: detecting whether the input/output module 4 receives a wireless disconnection instruction entered by the user; and if the input/output module 4 receives the wireless disconnection instruction entered by the user, controlling the memory 6 to delete the stored access point information.

In this embodiment of the present invention, the foregoing access point information includes one or more pieces of WIFI access point information and Bluetooth access point information.

It should be noted that only components in the terminal device that are required for implementing the wireless access method disclosed in the embodiments of the present invention are marked in the terminal device shown in FIG. 14. Other components such as a physical key, a keyboard, a power supply, and a housing that the terminal device can have are not marked in this embodiment of the present invention because this does not affect implementation of the embodiments of the present invention.

In the terminal device described in FIG. 14, the terminal device can not only complete automatic access to an access point, but also avoid operations of manually enabling access point search and manually entering a password by a user, so that efficiency in accessing the access point can be effectively improved.

Figure 15:
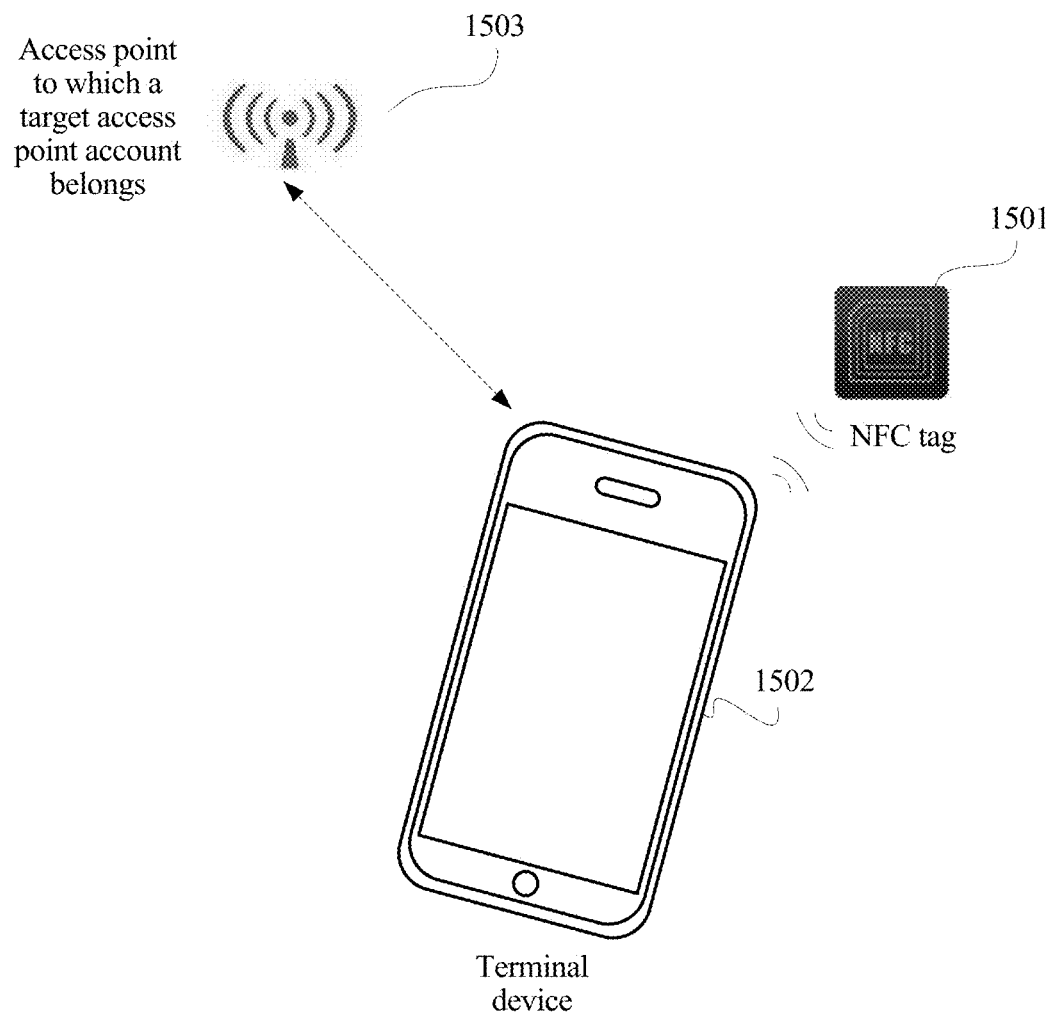
FIG. 15 is a schematic network diagram of a wireless access system according to an embodiment of the present invention.

Referring to FIG. 15, FIG. 15 is a schematic network diagram of a wireless access system according to an embodiment of the present invention. The wireless access system shown in FIG. 15 may include: a terminal device 1502, an NFC tag 1501 and an access point 1503 to which target access point information belongs that are independent of the terminal device 1502.

The NFC tag 1501 is configured to store access point information.

The terminal device 1502 is configured to: read the access point information stored in the NFC tag 1501, acquire one piece of the target access point information according to the read access point information, and establish, according to the target access point information, a wireless connection to the access point 1503 to which the target access point information belongs.

In an implementation manner, a manner in which the terminal device 1502 acquires the one piece of target access point information according to the read access point account may be as follows: the terminal device 1502 is configured to: detect a signal strength value of an access point to which each piece of the read access point information belongs, and select access point information of an access point whose signal strength value is the largest as a target access point account.

In this manner, the terminal device 1502 can automatically select, in the background, the access point information of the access point whose signal strength value is the largest as the target access point information.

In another implementation manner, a manner in which the terminal device 1502 acquires one piece of the target access point account according to the read access point account may be as follows: the terminal device 1502 is configured to: detect a signal strength value of an access point to which each piece of the read access point information belongs, and output each piece of the read access point information and the detected signal strength value of the access point to which the access point information belongs; and detect one piece of access point information that is selected by a user according to the signal strength value from the access point information output by the terminal device 1502, and use the piece of access point information as the target access point information.

In this manner, the user can select desirable access point information as the target access point information.

In an implementation manner, the foregoing access point information includes an access point account. Correspondingly, a manner in which the terminal device 1502 establishes, according to the target access point information, the wireless connection to the access point 1503 to which the target access point information belongs may be as follows: the terminal device 1502 is configured to: send, according to a target access point account, a wireless connection request to the access point 1503 to which the target access point account belongs, where the wireless connection request includes an access password bound to the target access point account; and receive a wireless connection success response that is sent after the access point 1503 to which the target access point account belongs verifies that the access password bound to the target access point account is correct.

In an implementation manner, the foregoing access point information includes an access point account and an access password bound to the access point account. Correspondingly, a manner in which the terminal device 1502 establishes, according to the target access point information, the wireless connection to the access point 1503 to which the target access point information belongs may be as follows: the terminal device 1502 is configured to: send, according to a target access point account, a wireless connection request to the access point 1503 to which the target access point account belongs; receive prompt information sent by the access point 1503 to which the target access point account belongs, where the prompt information is used to prompt sending of an access password bound to the target access point account; send the access password bound to the target access point account to the access point 1503 to which the target access point account belongs; and receive a wireless connection success response that is sent after the access point 1503 to which the target access point account belongs verifies that the access password bound to the target access point account is correct.

In an implementation manner, when the foregoing access point information includes an access point account and an access password bound to the access point account, a manner in which the terminal device 1502 establishes, according to the target access point information, the wireless connection to the access point 1503 to which the target access point information belongs may be as follows: the terminal device 1503 is configured to: send, according to a target access point account, a wireless connection request to the access point 1503 to which the target access point account belongs; receive prompt information sent by the access point 1503 to which the target access point account belongs, where the prompt information is used to prompt sending of an access password bound to the target access point account; send the access password bound to the target access point account to the access point 1503 to which the target access point account belongs; and receive a wireless connection success response that is sent after the access point 1503 to which the target access point account belongs verifies that the access password bound to the target access point account is correct.

In an implementation manner, the terminal device 1502 is further configured to store the access point information after reading the access point information stored in the NFC tag 1501.

In an implementation manner, the terminal device 1502 is further configured to: after storing the access point information, determine whether a storage time of the access point information exceeds a preset threshold; and if the storage time exceeds the preset threshold, delete the stored access point information.

In an implementation manner, the terminal device 1502 is further configured to: after storing the access point information, detect whether a wireless disconnection instruction entered by the user is received; and if the wireless disconnection instruction entered by the user is received, delete the stored access point information.

In this embodiment of the present invention, the foregoing access point information includes one or more pieces of WIFI access point information and Bluetooth access point information.

In the system described in FIG. 15, a terminal device can not only complete automatic access to an access point, but also avoid operations of manually enabling access point search and manually entering a password by a user, so that efficiency in accessing the access point can be effectively improved.

The foregoing wireless access method, terminal device, and system that are disclosed in the embodiments of the present invention are not only applicable to a public place or a house in which only one access point is deployed, but also applicable to a public place or a house in which multiple access points are deployed, which is not limited in this embodiment of the present invention.

According to the foregoing wireless access method, terminal device, and system that are disclosed in the embodiments of the present invention, an NFC tag stores an access point account and an access password bound to the access point account, so that access point information may not be displayed in a plaintext manner. A user that needs to implement interconnection with the Internet by using an access point only needs to hold a terminal to approach the NFC tag, so as to execute the wireless access method disclosed in the embodiments of the present invention. When the NFC tag is fixed in places such as a house and a shop, a "freeloading" operation that is performed by a user that stays relatively far from places such as a house and a shop and that is caused because access point information is displayed in a plaintext manner can be avoided.

In the foregoing embodiments, the descriptions of the embodiments have respective focuses. For a part that is not described in detail in an embodiment, reference may be made to related descriptions in other embodiments.

Persons of ordinary skill in the art may understand that all or a part of the steps of the foregoing method embodiments may be implemented by a program instructing hardware related to a terminal device. The foregoing program may be stored in a computer readable storage medium. When the program runs, the steps of the foregoing method embodiments are performed. The foregoing storage medium includes: any medium that can store program code, such as a USB flash drive, a read-only memory (ROM), a random access memory (RAM), a magnetic disk, or an optical disc.

The foregoing describes in detail the wireless access method, and the related device and system disclosed in the embodiments of the present invention. Specific examples are used in this specification to describe the principle and implementation manners of the present invention. The descriptions of the foregoing embodiments are merely intended to facilitate understanding of the method and core idea of the present invention. In addition, with respect to the specific implementation manners and the application scope, modifications may be made by persons of ordinary skill in the art according to the idea of the present invention. In conclusion, the content of this specification shall not be construed as a limitation on the present invention.

What is claimed is:

1. A wireless access method, comprising:
reading, by a terminal device, wireless fidelity (WIFI) access point information stored in an external near field communication tag by means of approaching the external near field communication tag, wherein the WIFI access point information comprises a WIFI access point account and an access password bound to the WIFI access point account;
acquiring, by the terminal device, the read access point information as target access point information;
in a case that the target access point information is WIFI access point information, enabling a WIFI module when the WIFI module is disabled; and
establishing automatically, according to the target access point information, a wireless connection to an access point to which the target access point information belongs.

2. The method according to claim 1, wherein the acquiring, by the terminal device, the read access point information as target access point information comprises:
detecting, by the terminal device, a signal strength value of an access point to which each piece of the read WIFI access point information belongs; and
selecting, by the terminal device, access point information of an access point whose signal strength value is the largest as the target access point information.

3. The method according to claim 1, wherein the acquiring, by the terminal device, the read access point information as target access point information comprises:
detecting, by the terminal device, a signal strength value of an access point to which each piece of the read WIFI access point information belongs;
outputting, by the terminal device, each piece of the read WIFI access point information and the signal strength value of the access point to which the access point information belongs; and
detecting, by the terminal device, one piece of access point information that is selected by a user according to the signal strength value from the WIFI access point information output by the terminal device, and using the piece of access point information as a target access point information.

4. The method according to claim 1, wherein the establishing automatically, by the terminal device according to the target access point information, a wireless connection to an access point to which the target access point information belongs comprises:
sending, by the terminal device according to a target access point account, a wireless connection request to an access point to which the target access point account belongs, wherein the wireless connection request comprises an access password bound to the target access point account; and receiving a wireless connection success response that is sent after the access point to which the target access point account belongs verifies that the access password bound to the target access point account is correct.

5. The method according to claim 1, wherein the establishing automatically, by the terminal device according to the target access point information, a wireless connection to an access point to which the target access point information belongs comprises:
sending, by the terminal device according to a target access point account, a wireless connection request to an access point to which the target access point account belongs;
receiving, by the terminal device, prompt information sent by the access point to which the target access point account belongs, wherein the prompt information is used to prompt sending of an access password bound to the target access point account;
sending, by the terminal device, the access password bound to the target access point account to the access point to which the target access point account belongs; and
receiving, by the terminal device, a wireless connection success response that is sent after the access point to which the target access point account belongs verifies that the access password bound to the target access point account is correct.

6. A terminal device, comprising a processor, a near field communication (NFC), module and an input/output module that are connected to the processor by using an interface, a memory that is connected to the processor by using a bus, a coupler that is connected to the processor by using multiple network interfaces, and an antenna module that is connected to the coupler, wherein the memory stores a group of program code, and the processor is configured to invoke the program code stored in the memory, and is configured to:
control the NFC module to read wireless fidelity (WIFI) access point information stored in an external NFC tag by means of approaching the external NFC tag, wherein the WIFI access point information comprises a WIFI access point account and an access password bound to the WIFI access point account;
acquire the read access point information as target access point information;
in a case that the target access point information is WIFI access point information, enable a WIFI module when the WIFI module is disabled; and
establish automatically, according to the target access point information, a wireless connection between the antenna module and an access point to which the target access point information belongs.

7. The terminal device according to claim 6, wherein the processor is configured to:
control the antenna module to detect a signal of an access point to which each piece of the read WIFI access point information belongs;
calculate a signal strength value that is of the access point to which each piece of the WIFI access point information belongs and that is detected by the antenna module; and
select access point information of an access point whose signal strength value is the largest as the target access point information.

8. The terminal device according to claim 6, wherein the processor is configured to:
control the antenna module to detect a signal of an access point to which each piece of the read WIFI access point information belongs;
calculate a signal strength value that is of the access point to which each piece of the WIFI access point information belongs and that is detected by the antenna module;
control the input/output module to output each piece of the WIFI access point information and the signal strength value that is of the access point to which the WIFI access point information belongs and that is obtained by means of calculation; and
control the input/output module to detect one piece of access point information that is selected by a user according to the signal strength value from the access point information output by the input/output module, and use the piece of access point information as the target access point information.

9. The terminal device according to claim 6, wherein the processor is configured to:
control the antenna module to send, according to a target access point account, a wireless connection request to an access point to which the target access point account belongs, wherein the wireless connection request comprises an access password bound to the target access point account, so that the antenna module receives a wireless connection success response that is sent after the access point to which the target access point account belongs verifies that the access password bound to the target access point account is correct.

10. The terminal device according to claim 6, wherein the processor is configured to:
control the antenna module to send, according to a target access point account, a wireless connection request to an access point to which the target access point account belongs, so that the antenna module receives prompt information sent by the access point to which the target access point account belongs, wherein the prompt information is used to prompt sending of an access password bound to the target access point account, and so that the antenna module sends the access password bound to the target access point account to the access point to which the target access point account belongs, and receives a wireless connection success response that is sent after the access point to which the target access point account belongs verifies that the access password bound to the target access point account is correct.

11. The terminal device according to claim 6, wherein the processor is configured to:
control the memory to store the read WIFI access point information;
determine whether a storage time of the WIFI access point information exceeds a preset threshold; and if the storage time exceeds the preset threshold, control the memory to delete the stored WIFI access point information.

12. The terminal device according to claim 6, wherein the WIFI access point information comprises one or more pieces of WIFI access point information or Bluetooth access point information.

13. A wireless access system, comprising: a terminal device, and a near field communication tag and a WIFI access point to which target access point information belongs that are independent of the terminal device, wherein:
the near field communication tag is configured to store WIFI access point information, wherein the WIFI access point information comprises a WIFI access point account and an access password bound to the WIFI access point account; and
the terminal device is configured to: read the WIFI access point information stored in the near field communication tag by means of approaching the near field communication tag, acquire the read access point information as target access point information, in a case that the target access point information is WIFI access point information, enable the WIFI access point if the WIFI access point is disabled, and establish automatically, according to the target access point information, a wireless connection to the access point to which the target access point information belongs.

14. The system according to claim 13, wherein a manner in which the terminal device acquires the read access point information as target access point information is as follows:
the terminal device is configured to: detect a signal strength value of an access point to which each piece of the read WIFI access point information belongs, and select access point information of an access point whose signal strength value is the largest as a target access point account.

15. The system according to claim 13, wherein a manner in which the terminal device acquires the read access point information as target access point information is as follows:
the terminal device is configured to: detect a signal strength value of an access point to which each piece of the read WIFI access point information belongs, and output each piece of the read WIFI access point information and the detected signal strength value of the access point to which the access point information belongs; and detect one piece of access point information that is selected by a user according to the signal strength value from the access point information output by the terminal device, and use the piece of access point information as the target access point information.

16. The system according to claim 13, wherein a manner in which the terminal device establishes automatically, according to the target access point information, the wireless connection to the access point to which the target access point information belongs is as follows:
the terminal device is configured to: send, according to a target access point account, a wireless connection request to an access point to which the target access point account belongs, wherein the wireless connection request comprises an access password bound to the target access point account; and receive a wireless connection success response that is sent after the access point to which the target access point account belongs verifies that the access password bound to the target access point account is correct.

17. The system according to claim 13, wherein the terminal device is further configured to: store the WIFI access point information after reading the WIFI access point information stored in the near field communication tag; after storing the WIFI access point information, determine whether a storage time of the WIFI access point information exceeds a preset threshold; and if the storage time exceeds the preset threshold, delete the stored WIFI access point information.

* * * * *